(12) United States Patent
Carresjö et al.

(10) Patent No.: US 10,035,387 B2
(45) Date of Patent: Jul. 31, 2018

(54) WHEEL-MONITORING MODULE

(75) Inventors: Erik Carresjö, Käma (SE); Per Hasselberg, Torslanda (SE); Anders Trygg, Onsala (SE)

(73) Assignee: Volvo Lastvagnar AB, Göteborg (SE)

( * ) Notice: Subject to any disclaimer, the term of this patent is extended or adjusted under 35 U.S.C. 154(b) by 763 days.

(21) Appl. No.: 12/742,399

(22) PCT Filed: Nov. 30, 2007

(86) PCT No.: PCT/SE2007/001064
§ 371 (c)(1),
(2), (4) Date: May 11, 2010

(87) PCT Pub. No.: WO2009/070063
PCT Pub. Date: Jun. 4, 2009

(65) Prior Publication Data
US 2010/0256946 A1 Oct. 7, 2010

(51) Int. Cl.
| | |
|---|---|
| *G01L 27/00* | (2006.01) |
| *G01L 7/00* | (2006.01) |
| *G01L 9/00* | (2006.01) |
| *G01L 11/00* | (2006.01) |
| *G01L 13/00* | (2006.01) |
| *G01L 15/00* | (2006.01) |
| *G01L 17/00* | (2006.01) |
| *G01L 19/00* | (2006.01) |
| *G01L 21/00* | (2006.01) |
| *G01L 21/02* | (2006.01) |
| *G01N 7/00* | (2006.01) |
| *B60C 23/04* | (2006.01) |
| *G07C 5/08* | (2006.01) |

(52) U.S. Cl.
CPC ...... *B60C 23/0462* (2013.01); *B60C 23/0474* (2013.01); *G01L 17/00* (2013.01); *G01L 27/00* (2013.01); *G07C 5/085* (2013.01)

(58) Field of Classification Search
CPC ..... G01L 17/00; G01L 27/00; B60C 23/0408; B60C 23/0474
USPC ................................................... 702/98, 140
See application file for complete search history.

(56) References Cited

U.S. PATENT DOCUMENTS 5,559,484 A    9/1996  Nowicki et al.
5,573,610 A *  11/1996 Koch et al. ............. 152/152.1
(Continued)

FOREIGN PATENT DOCUMENTS

EP    1544002 A1    6/2005
GB    2385931 A     9/2003
(Continued)

OTHER PUBLICATIONS

Definition of "Valid", Free Online Dictionary, printed Apr. 9, 2013.*
(Continued)

*Primary Examiner* — Michael Nghiem
(74) *Attorney, Agent, or Firm* — WRB-IP LLP

(57) ABSTRACT

A module is operable to monitor at least a pressure within a tire of a wheel, the module being operatively mounted to said wheel, the module including (a) a pressure sensor for measuring the pressure (P) and generating a corresponding pressure signal; and b1) an associated data memory including a data field containing data relevant to the functional status of the tire.

30 Claims, 19 Drawing Sheets

(56) References Cited

U.S. PATENT DOCUMENTS

| | | | |
|---|---|---|---|
| 5,760,682 A | | 6/1998 | Liu et al. |
| 5,950,667 A | * | 9/1999 | Nicewonger .......... B23K 11/36 |
| | | | 137/459 |
| 6,087,930 A | | 7/2000 | Kulka et al. |
| 6,164,116 A | * | 12/2000 | Rice .................... G01M 3/2876 |
| | | | 73/1.72 |
| 6,604,032 B1 | * | 8/2003 | Moller .......................... 701/29.2 |
| 6,750,762 B1 | | 6/2004 | Porter et al. |
| 6,885,296 B2 | | 4/2005 | Hardman et al. |
| 2006/0048567 A1 | * | 3/2006 | Shimura ...................... 73/146.5 |
| 2007/0252685 A1 | | 11/2007 | Oda et al. |
| 2010/0274441 A1 | * | 10/2010 | Carresjo .......................... 701/33 |
| 2010/0274607 A1 | * | 10/2010 | Carresjo et al. .................. 705/7 |

FOREIGN PATENT DOCUMENTS

| | | | | |
|---|---|---|---|---|
| JP | 2003211924 A | | 7/2003 | |
| WO | WO 2006/089626 | * | 8/2006 | |
| WO | WO 2009/070063 | * | 6/2009 | |

OTHER PUBLICATIONS

Definition of Reliable, Online Dictionary, printed Apr. 20, 2015.*
Supplementary European Search report for corresponding European Application EP 07 85 2071, dated Jan. 16, 2012.
International Search Report for corresponding International Application PCT/SE2007/001064.

* cited by examiner

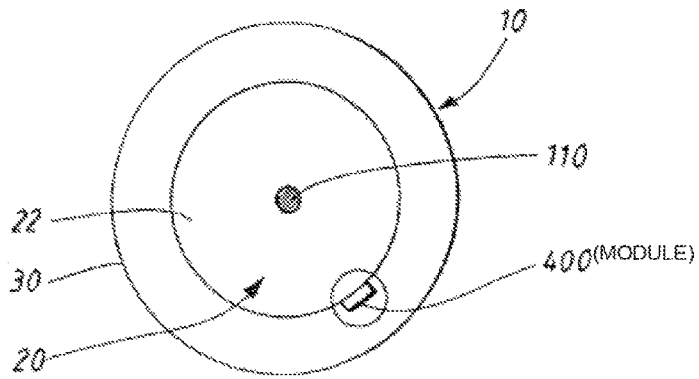
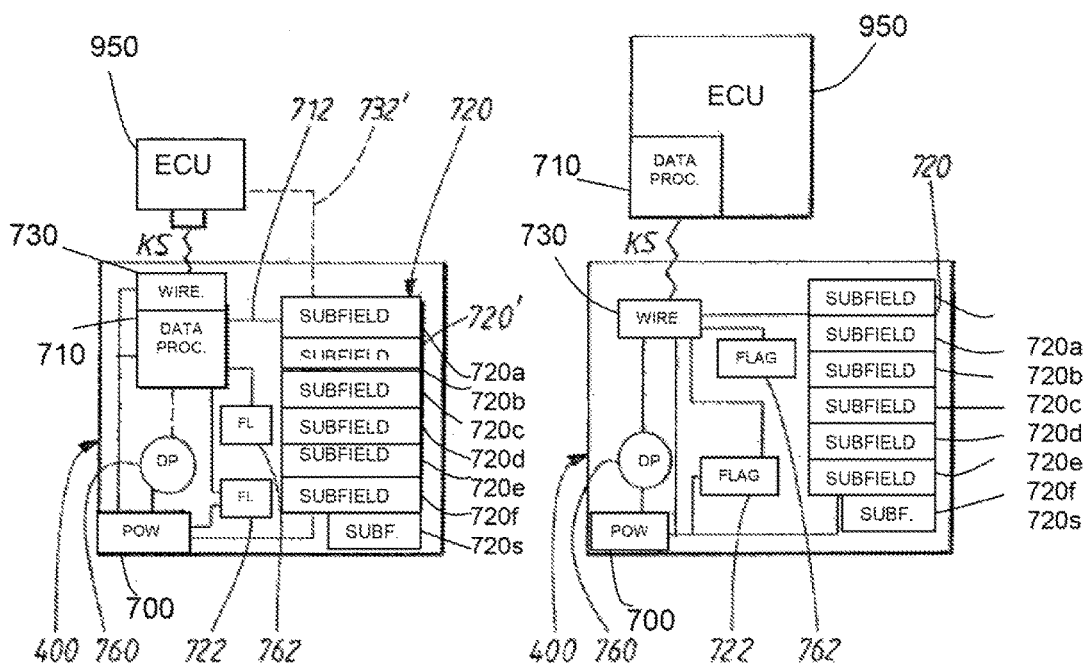
FIG.10a
FIG.10b
FIG.10c

WHEEL-MONITORING MODULE

BACKGROUND AND SUMMARY

The present invention relates to modules and associated apparatus operable to monitor characteristics of wheels and/or their associated tyres; for example, to a module and associated apparatus for monitoring characteristics of wheels and/or their associated tires and conveying information indicative of these aforementioned characteristics via a communication link to an electronic control unit (ECU) and/or control system, for example for user-display. Moreover, the present invention also concerns methods of monitoring characteristics of wheels and/or their associated tires. Furthermore, the present invention also relates to software and software products executable on computing hardware for executing these aforesaid methods.

Tyres, also known as "tires" in American-English, are critical components in road vehicles. Contemporary tires not only ensure adhesion of their associated road vehicles to road surfaces in widely varying weather conditions, but also perform vibration and shock isolation functions. Moreover, during their operating lifetime, tires are required to survive potentially up to several thousand or even millions of deformation cycles without exhibiting work-hardening failure, and yet exhibit a relatively modest degree of energy dissipation therein as a result of viscous dampening effects. As an additional operating requirement, contemporary tires need to be robust against scuffing and objects impacting thereonto. Yet further, tubeless tires are required to robustly grip onto their associated wheel hubs even when subject to considerable stresses, for example during emergency braking. In response to these aforementioned requirements for contemporary tires, the tires are constructed from elastic synthetic rubber, natural rubber and/or plastics material reinforced by meshes of metal wire, carbon fibre and similar. Modern tires are therefore to be respected as highly optimized and advanced products.

Tire failure during operation can potentially result in immobilization of an associated vehicle or even accident. Moreover, tires operated at unsuitable pressures can adversely influence associated vehicle fuel economy; fuel economy is becoming increasingly pertinent in view of increases in fuel costs as well as in view of carbon dioxide generation and its perceived impact on World climate change.

It is known to mount sensors onto automobiles to monitor characteristics such as tire pressure and acceleration in one or more orthogonal axes, and to convey information representative of these characteristics via wireless communication links to electronic control units (ECU) forming parts of data management systems of the vehicles. By employing such arrangements, it is possible to warn drivers of a need to inflate one or more tires of their vehicles in order to improve driving quality and safety.

In a published Japanese patent no. JP 2003211924 (Mazda Motor), there is a disclosed a pneumatic sensor device suitable for use with a tire of a vehicle for detecting tire pressure and generating corresponding tire pressure information. The device includes a transmitter for transmitting the pressure information together with an identification code for distinguishing the sensor device from other such sensor devices simultaneously included on other wheels of the vehicle. A control unit of the vehicle is operable to receive the transmitted pressure information and its associated identification code. The received pressure information is stored in a memory of the control unit. The control unit is operable to raise an alarm in an event that tire pressure is not correct pursuant to predefined criteria.

In a published United Kingdom patent application no. GB 2385931 A, tire monitors are described which are mounted adjacent to tires near their tire inflation valve stems. The tire monitors include sensors to measure pressure, temperature and rotation direction of their respective tires. Moreover, the monitors are operable to communicate measured sensor signals via transmitters to their respective receiver for subsequent processing and eventual presentation on a display unit. A vehicle mounted controller in communication with the receiver is operable to determine whether pressure information is associated with a front tire or a rear tire based on the strength of the wireless signal received at the receiver, and whether pressure data is associated with a right tire or left tire based on associated rotation direction data.

A technical problem arising for fleet operators of vehicles is that wheels and tires of their vehicles are subject to maintenance events at various points in time. For example, there is a requirement in Northern Europe and Canada to seasonally switch between summer and winter tyres; such switch is usually achieved by exchanging wheels rather than removing tires from wheel hubs. However, wheels are removed from vehicles for other purposes, for example for puncture repair or replacing worn tires on wheels hubs. With such changes occurring, it is difficult for fleet operators to maintain an up-to-date record of conditions of tires on their vehicles and processes to which the wheels of their vehicles have been subjected. Owners of vehicles with defect tires can be subject to penalties from road authorities; such penalties are potentially mitigated when it can be shown that vehicle owners have used all endeavours to ensure that their vehicles are in good operating order. Moreover, it is within an interest of fleet operators that wheels and associated tires of their vehicles are in good order in order to avoid a proportion of time that vehicles are not in use and not earning money.

A technical problem addressed by the present invention is therefore to provide a more advanced wheel and tire monitoring apparatus and modules. Moreover, the present invention seeks to provide such wheel and tire monitoring apparatus and modules in a manner better suited, for example, to the requirements of commercial fleet operators; such fleet operators can, for example, include heavy commercial vehicle fleet operators, taxi fleet operators, and automobile leasing and hiring enterprises.

It is desirable to provide an improved wheel and/or tire monitoring apparatus and module which are capable of enhancing safety and reliability of vehicles, and also detecting tampering of wheels of vehicles.

According to a first aspect of the invention, there is provided a module operable to monitor at least a pressure (P) within a tire of a wheel, said module being operatively mounted to said wheel, said module includes:

(a) a pressure sensor for measuring said pressure and generating a corresponding pressure signal; and b1) an associated data memory including a data field containing data relevant to the functional status of the tyre; characterised in that said module includes a flag which can be set by a data processor to represent "VALID" or "INVALID" for denoting validity or invalidity of said data relevant to the functional status of the tire and that said flag is set to be changed from "VALID" to "INVALID" as soon as said pressure (P) measured by said pressure sensor falls below said predetermined threshold value.

The invention is of advantage in that the module is capable of providing enhanced monitoring of operation of the at least one wheel, thereby enhancing safety and reliability, by monitoring wheel characteristics.

By the inclusion of a flag that can be set by a data processor to represent "VALID" or "INVALID" for denoting validity or invalidity of said data relevant to the functional status of the tire and that said flag is set to be changed from "VALID" to "INVALID" as soon as said pressure (P) measured by said pressure sensor falls below said predetermined threshold value. It is possible for the operator to ensure that data relating to a specific tire is valid as long as it is attached to a specific wheel under the condition that a pressure loss exceeding the threshold value has not occurred. A loss of pressure exceeding the threshold value would indicate that the tire has been removed from the rim, that the tire has been used at pressure well below the operating pressure or that a puncture has occurred. Since, if any of these events have occurred, tire data can not be guaranteed because the tire may have been changed or the properties of the tire may have deteriorated due to puncture or excessive wear following use of the tire at an inappropriate pressure.

By thus monitoring the pressure and setting a flag indicating that the pressure has been kept above an intended pressure level it can be assured that data relevant to the functional status of the tire is valid. An on board system may therefore rely on the tire data stored in the associated memory and therefore adapt subsystems of the vehicle, such as application of braking forces for instance, to the data contained in the associated memory. In the event the data relating to the relevant to the functional status of the tire is classified as invalid, an on board system will adapt its function to default values assuming an inferior tire quality.

In order to ensure that the flag is not changed as soon as the pressure in the tire is refilled without verifying tire data by inspection, the data processor is prevented to change said flag from "INVALID" to "VALID" unless a key code signal is received externally from the module. However, after having verified tire quality by inspection, tire data can be reset to status "VALID" from status "INVALID". This may thus be done by said data processor upon reception of a key code signal is received externally from the module.

By these measures the validity of data relevant to the functional status of the tire can be ensured and it is safe to adapt subsystems of the vehicle to said data.

The invention furthermore relates, according to aspects thereof, to a method of validation of data relevant to the functional status of a tire stored in a module mounted in a wheel, and a method of detecting misuse of tires wherein a data processor is operable to continuously or periodically update data stored in a data field containing data relevant to the functional status of the tire, in which method validation of the data relevant to the functional status of the tire is performed by such a method.

Features of the invention are susceptible to being combined together in any combination without departing from the scope of the invention as defined by the appended claims.

DESCRIPTION OF THE DIAGRAMS

Embodiments of the present invention will now be described, by way of example only, with reference to the following diagrams wherein:

FIG. 10a represents a schematic view of a wheel at which a module according to the invention is mounted;

FIG. 10b represents a first embodiment of a module according to the invention, where a data processor is included in the module, which data processor controls an associated memory included in the module;

FIG. 10c represents a second embodiment of the invention, where the module is set to communicate with an external data processor via a wireless link, which external processor controls an associated memory included in the module;

Figure 1:
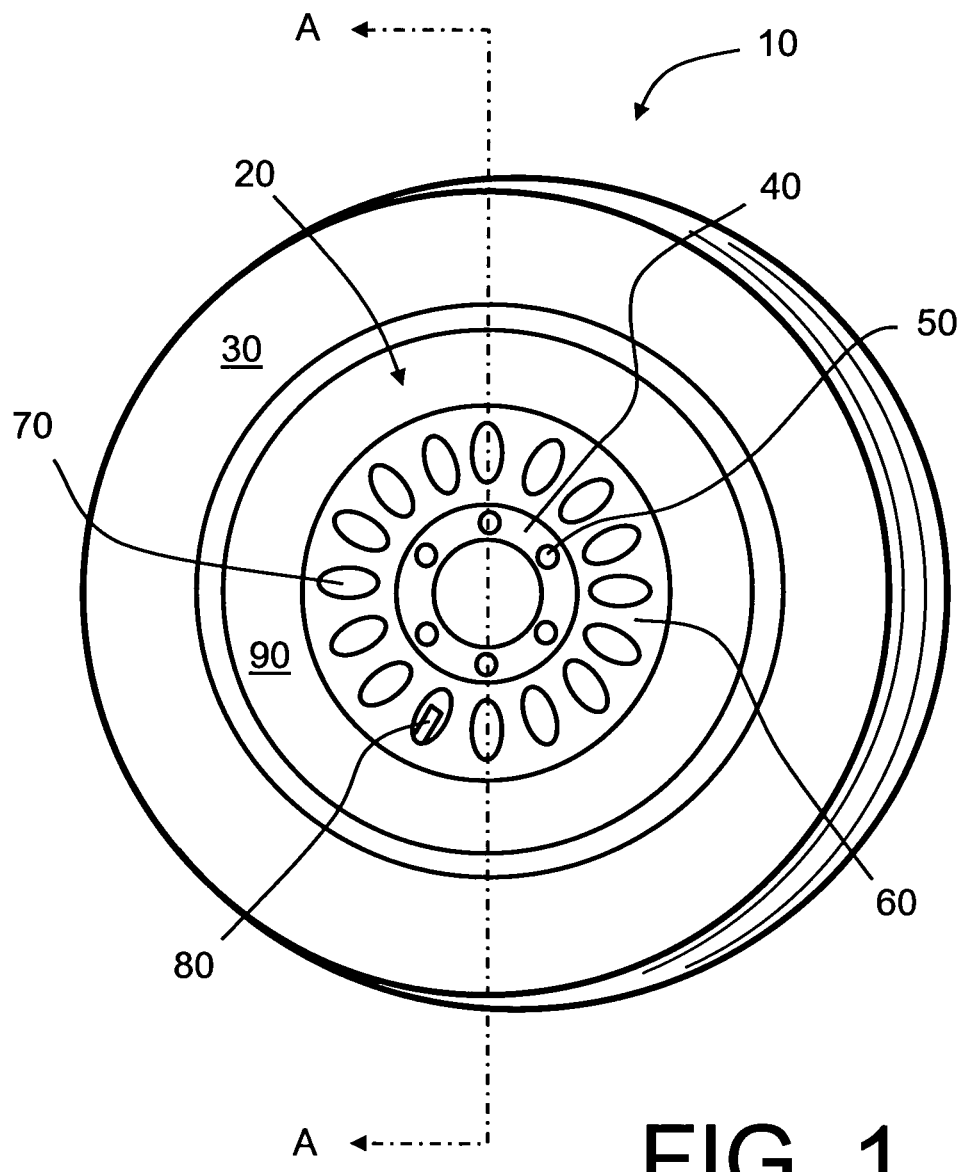
FIG. 1 is an illustration of a wheel of a contemporary heavy commercial vehicle.
Figure 17:
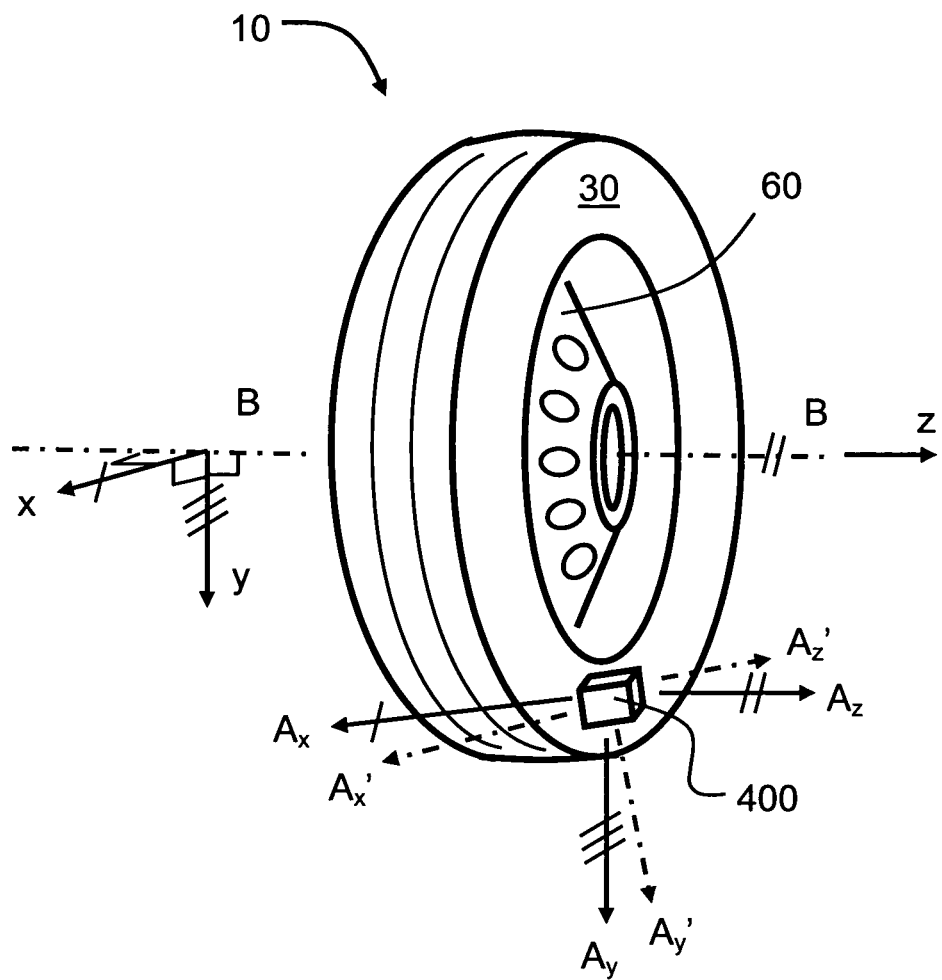
Figure 18:
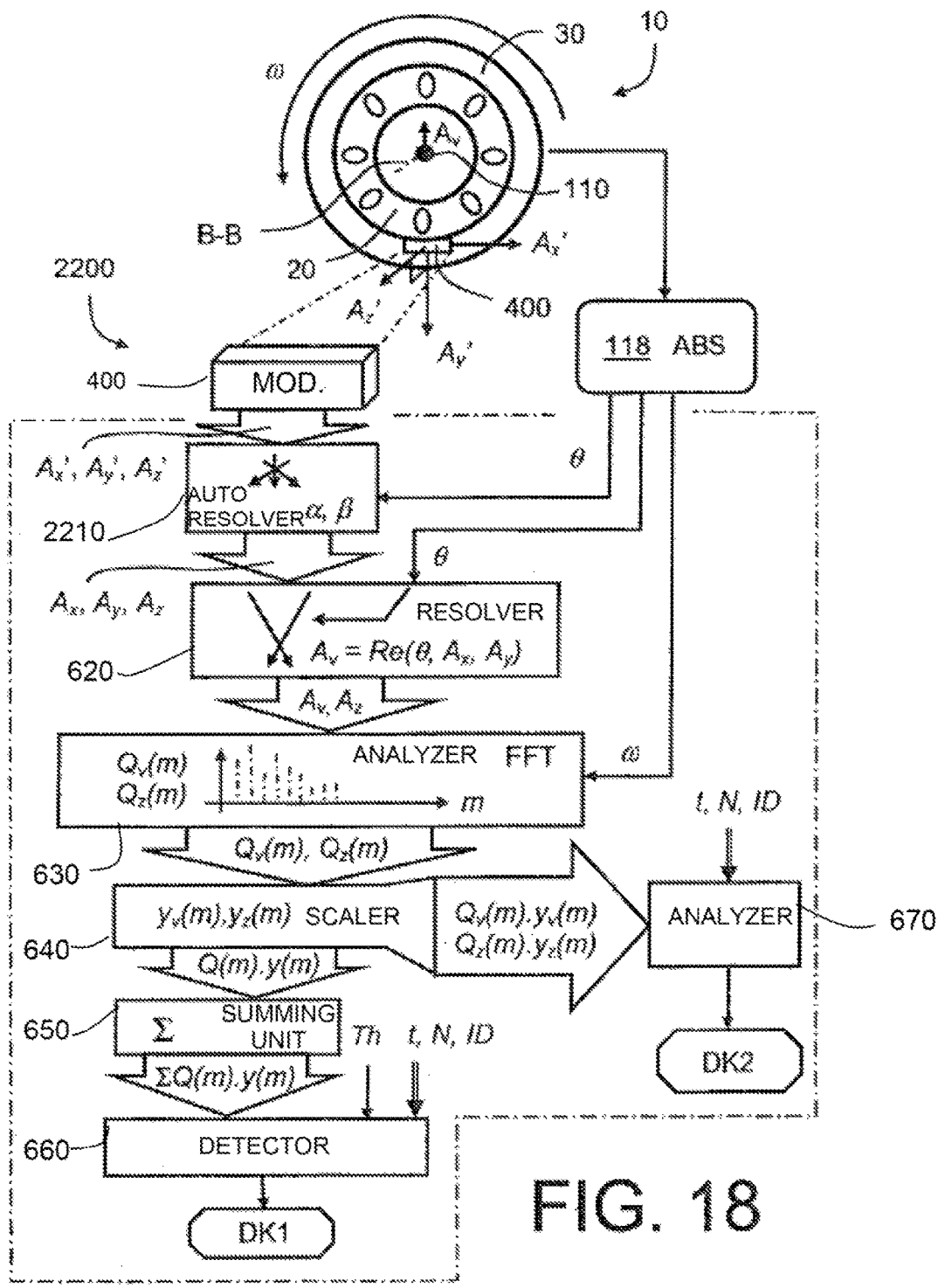

FIG. 17 is an illustration of the wheel of FIG. 1 provided with a module including an accelerometer, the module and its accelerometer being mounted such that its sensing axes are angularly misaligned with true traverse, radial and tangential axes of the wheel; and FIG. 18 is a fourth embodiment of a wheel- and tyre-monitoring apparatus pursuant to the present invention for use with the wheel of FIG. 17, the monitoring apparatus being operable to process acceleration signals.

DETAILED DESCRIPTION

1. Context of the Present Invention

Commercial enterprises which operate fleets of vehicles, for example fleets of heavy commercial vehicles, face different problems with vehicle maintenance and safety in comparison to private automobile owners for which contemporary tire monitoring devices have already been developed as elucidated in the foregoing. Reliability and safety for an enterprise operating a fleet of vehicles is extremely important on account of one accident, breakdown or legal incident potentially adversely affecting the enterprise's reputation and relationship with its customers. Vehicle maintenance, and avoidance of vehicle technical problems before they arise and cause disruption, is of considerable importance to enterprises operating fleets of vehicles.

In a fleet of vehicles, for example heavy commercial vehicles, there are multiple vehicles, and a set of wheel hubs for the vehicles which are equipped with new tires at various times. Wheel hubs can potentially be swapped between vehicles and be sporadically furnished with new tires when their existing tires are deemed to have been worn out. Moreover, in certain climates, for example Northern Europe and Canada, there is a legal requirement to switch between winter tires and summer tyres; such switch between winter tires and summer tires is achieved by exchanging wheel hubs rather than removing tires from their respective hubs.

Enterprises operating fleets of vehicles normally achieve greatest commercial efficiency when their vehicles are virtually all in use earning revenue; vehicles undergoing repair or standing idle represent an investment which does not generate profit, and can even represent a depreciation in value. An issue associated therewith is efficient maintenance of vehicles which are intensively in use, especially with regard to their wheels and tires. The present invention is of benefit by enabling improved monitoring and prediction of potential problems with wheels and tyres; fleet vehicles can, for example, be recalled or rescheduled for maintenance purposes. Increased quality of monitoring is achieved by using more optimal and innovative sensor configurations and associated data processing.

Referring to FIG. 1, there is shown in side view a schematic diagram of a wheel of a heavy commercial vehicle. The wheel is indicated generally by 10. Moreover, the wheel 10 comprises a steel hub indicted by 20 and a tire (tire) denoted by 30. The tire 30 is contemporarily often tubeless, namely does not include any separate inner tube. A circular inner flange 40 of the hub 20 includes a circular arrangement of mounting holes 50 for receiving bolts or similar fasteners for attaching the wheel 10 to an axle (not shown in FIG. 1) of its associated vehicle. Extending radially outwards from the inner flange 40 is a substantially frusto-conical web 60 having a radial series of circular or elliptical ventilation holes 70 formed therein as illustrated, for example one of these ventilation holes 70 enables access to an air valve 80 in fluid (air) communication with a volume enclosed by the tire 30 for purposes of inflating or deflating the tire 30. At its perimeter, the frusto-conical web 60 is coupled to a circular rim 90. The circular rim 90 is operable to receive the tire 30.

Figure 2:
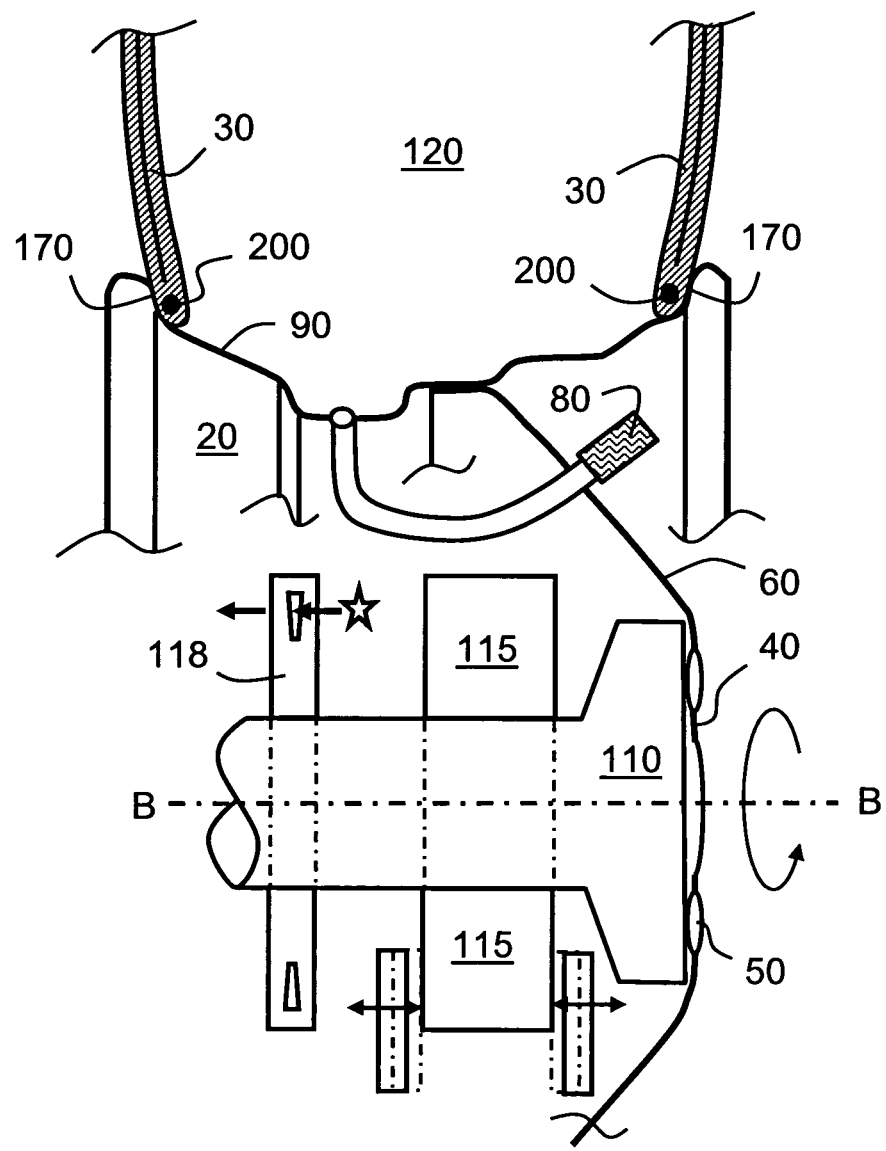
FIG. 2 is a schematic cross-sectional view of a portion of the wheel of FIG. 1.

In FIG. 1, a cross-sectional axis is denoted by A-A and a corresponding cross-sectional view of the wheel 10 is shown in FIG. 2 for substantially an upper portion of the wheel 10. The wheel 10 has a general form which has evolved over many years to substantially an optimal implementation for reasons which will now be elucidated. The inner flange 40 is provided with its regularly spaced configuration of mounting holes 50 for mounting securely the wheel 10 using aforementioned bolts or fasteners to an end of a wheel axle 110 of the corresponding vehicle; the wheel axle 110 is operable to rotate about an axis B-B. An excess of holes 50 is often provided to be certain of retaining the wheel 10 onto the wheel axle 110. Usually, for heavy commercial vehicles, a disc brake 115 is included near an end of the wheel axle 110 in relative close proximity to the frusto-conical web 60 and its associated ventilation holes 70. Moreover, an ABS angular sensor encoder 118 for implementing an ABS baking system for sensing an angular orientation of the axle 110 and hence that of the wheel 10 is contemporarily included as standard components on heavy commercial vehicles; the angular sensor encoder 118 is operable to generate a signal indicative of an angular orientation $\Theta$ of the wheel 10. The angular sensor encoder 118 is often implemented as an optical, electrostatic and/or magnetic sensing device.

In operation, when bringing a commercial vehicle weighing 10 tonnes from a speed of 80 km/hour to standstill within a few seconds corresponds to absorbing kinetic energy in an order of $3 \times 10^6$ Joules which can result in an instantaneous rate of energy dissipation in the disc brake 115 associated with the axle 110 in an order of ten's of kilowatts. The holes 70 in the frusto-conical web 60 thus enable air circulation to reach one or more metal discs of the disc brake 115 for cooling purposes. Moreover, the holes 70 in the web 60 also assist to reduce an unsprung weight of the wheel 10 without adversely influencing its mechanical strength, as well as providing access for the valve 80. The rim 90 has various ridges formed therein to enhance its mechanical strength and also has end ridges 170 to provide reliable retention of the tire 30 in operation. The tire 30 encloses a volume denoted by 120 which is maintained at an elevated pressure P during operation.

Figure 3:
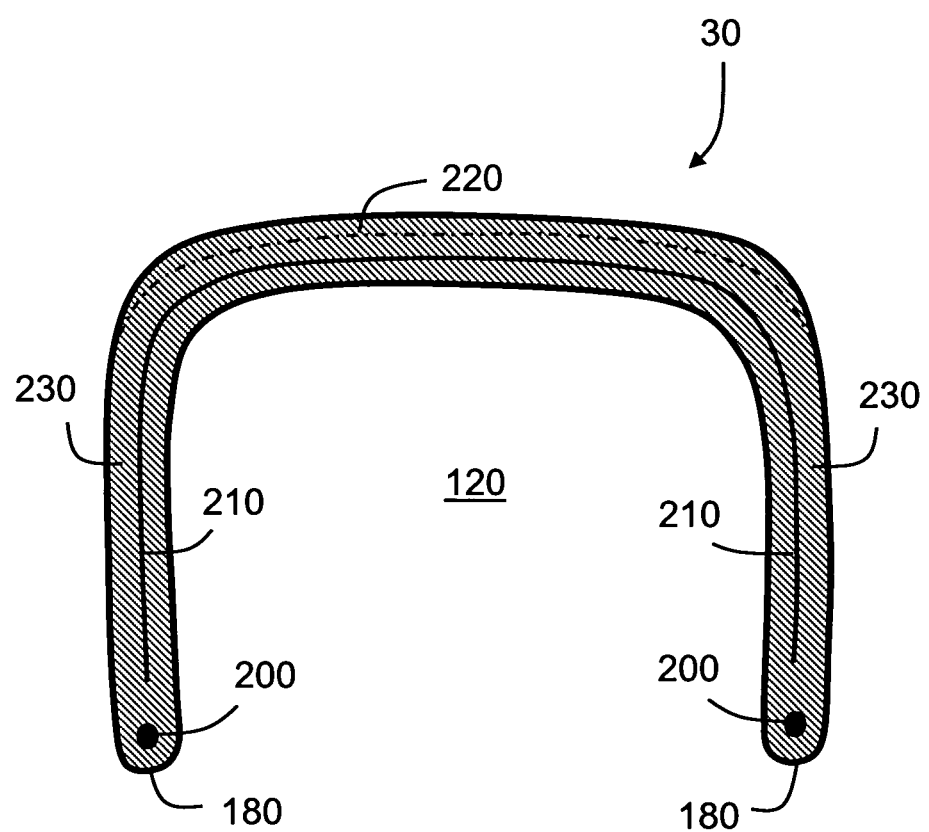
FIG. 3 is a schematic cross-sectional view of a tire (tire) of the wheel of FIG. 1.

Referring next to FIG. 3, an illustrative cross-sectional view of a portion of the tire 30 is shown. The tire 30 includes inner edges 180 for abutment onto the ridges 170 of the circular rim 90. The inner edges 180 are often reinforced using steel rings or bands 200 molded into the tire 30. Moreover, the tire 30 includes one or more reinforced woven metal and/or reinforced fibre meshes 210 embedded by molding into the tire 30. A tread portion 220 of the tire 30 has a greater radial thickness in comparison to a lateral thickness of side walls 230 of the tire 30; the tread portion 220 is thicker for accommodating treads of the tire 30. In operation, the tread portion 220 is operable to provide a firm grip to a road surface (not shown) as well as a water draining function, whereas the walls 230 are designed to periodically elastically flex when the wheel 10 with its associated tire 30 rotate in operation on the road surface.

Figure 5:
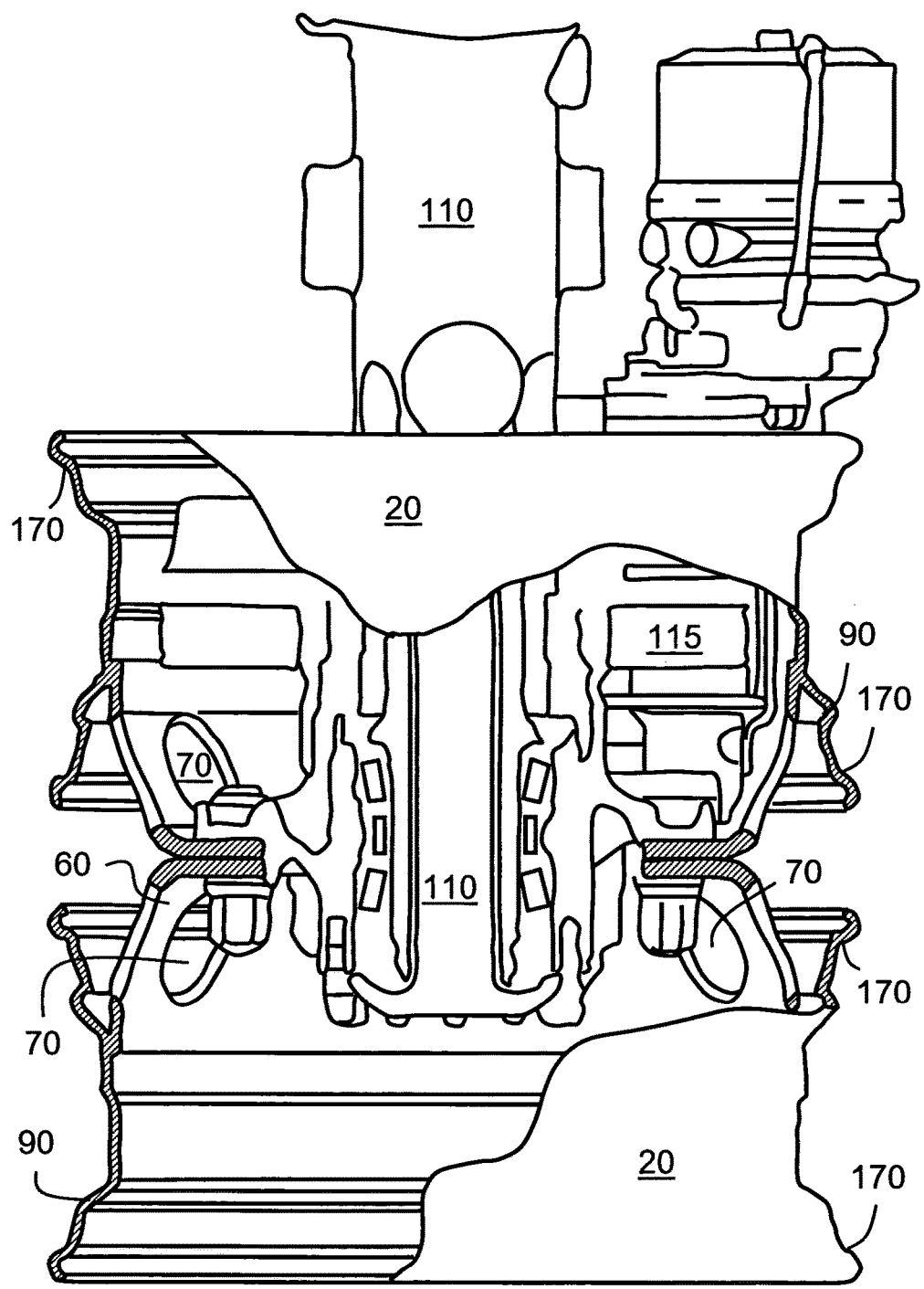
FIG. 5 is a cross-sectional view of a contemporary rear wheel assembly of a heavy commercial vehicle.

There are several potential modes of failure of the tire 30, and even of the wheel 10, which an enterprise operating a fleet of vehicles, for example heavy commercial vehicles, employing such wheels 10 would desire to identify and correct before various modes of failure cause breakdown, accident or delay involving vehicles. Problems that are encountered include:

(a) the air pressure P in the tire 30 is too low causing excessive flexure of the walls 230 and associated one or more meshes 210 with a risk of them work-hardening and prematurely fracturing; when the air pressure P is too low, there arises an excessive contact area between the tire 30 and a road surface interfacing to the tire 30 causing excessive tire wear, and also increased rolling resistance and hence poor vehicle fuel economy; too much contact area between the tire 30 and the road surface can also paradoxically result in inferior grip between the tire 30 and the road surface in icy and snowy conditions because contact force between the tire 30 and the road surface is not as concentrated as ideally desired to force the tire 30 to conform to surface irregularities in the road surface susceptible to providing grip. Excess deformation of the tire 30 when its internal air pressure P is too low potentially causes excess energy dissipation by a degree of non-elastic deformation within the tire 30 with associated temperature rise resulting therefrom which can, in a worst case, exceed a temperature which material from which the tire 30 is fabricated is able to tolerate. Moreover, when the pressure P within the tire 30 is too low, there is also a risk that the inner edges 180 loose their seal with the ridges 170 when subject to severe lateral stress, for example when scuffing along a curb stone, with subsequent sudden loss of air from the tire 30;

(b) one or more of bolts or fasteners applied to the holes 50 for securing the wheel 10 to the wheel axle 110 can potentially be inadequately tightened during attachment of the wheel 10 to the axle 110, or are susceptible to potentially working loose in operation; such loosening and potential loss of one or more of the bolts or fasteners can result in the wheel 10 wobbling or rattling on the axle 110 and, in a worst case, even becoming detached from the axle 110 and rolling off (!);

(c) the tire 30 and/or the valve 80 can develop a leak such that a partial loss of the pressure P within the tire 30 in operation arises; if such loss of pressure P is undetected, problems as outlined in (a) in the foregoing can potentially arise; however, the pressure P is a function of a temperature of the tire $T_{tire}$, and also whether or not the tire 30 is periodically maintained by being recharged with compressed air or other gas through its valve 80;

(d) the tire 30 can develop in use an imbalance, for example a portion of rubber of the tire 30 can become unevenly eroded with use, or a balancing weight earlier added to the wheel 10 can become detached from the wheel 10; in a situation of a double-tire arrangement as illustrated in FIG. 5 often employed at a rear of a heavy commercial vehicle, it is known for a building brick or similar object to occasionally become wedged between the double-tires and represent a dangerous projectile in an event of the object subsequently becoming dislodged by centrifugal force whilst the double wheel is rotating; such ejected objects from tires potentially represents a considerable danger when they smash through an automobile front window resulting in injury or accident; and (e) the tire 30 can become oval or distorted in some other symmetrical manner which does not necessarily cause an asymmetrical imbalance to the wheel 10; moreover, the hub 20 itself can become bent and thereby skewed out-of-plane without necessarily causing an asymmetrical imbalance in the wheel 10.

Figure 4:
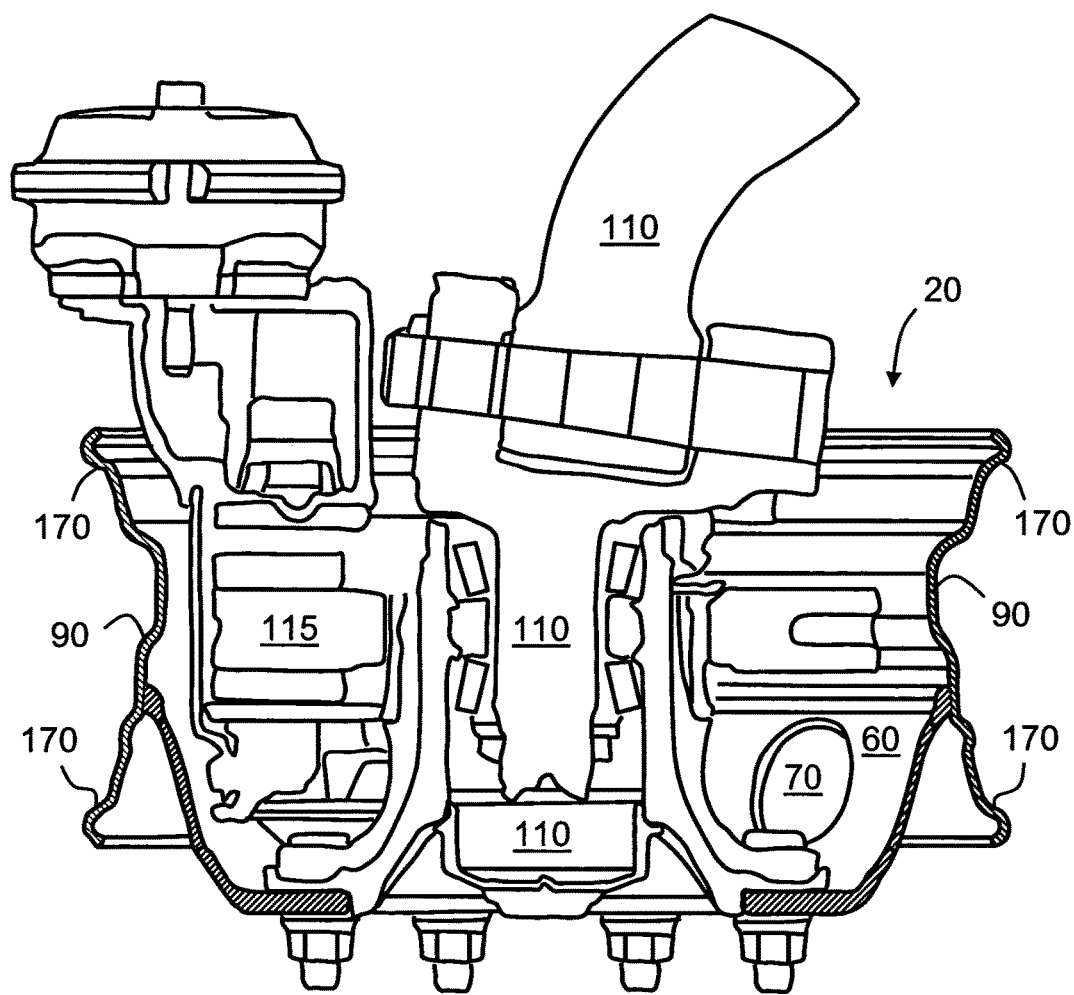
FIG. 4 is a cross-sectional view of a contemporary front wheel assembly of a heavy commercial vehicle.

Referring to FIGS. 4 and 5, there are shown diagrams of example contemporary manufactured front and rear wheel assemblies of a heavy commercial vehicle to illustrate how compact regions around vehicle wheels are in practice. There is little extra volume in the front and wheel assemblies for accommodating additional instrumentation for monitoring wheel operating conditions. Amongst other factors, components associated with the aforesaid brake 115 are included in close proximity to the wheel 10 in operation; the brake 115 has associated therewith other components such as servo actuators for forcing brake pad components against a disk component of the brake 115. However, it is conventional practice to include around the wheel axle 110 and in close proximity to the wheel 10 the aforesaid ABS sensor encoder 118 (not shown in FIGS. 4 and 5) for measuring the angular position (9 of the wheel 10 when mounted on its axle 110.

Characteristics which are beneficial to measure in order to monitor wheel 10 and associated tire 30 condition include pressure P, temperature T, and instantaneous acceleration A during operation. It is additionally also feasible to include film strain gauges within or bonded onto walls 230 of the tire 30 to measure their wall flexure. Temperature T and acceleration A can be measured at various spatial positions on the wheel 10 with mutually different results, whereas the pressure P developed within the volume denoted by 120 enclosed by the tire 30 in operation is effectively similar because the pressure P equalizes in a relatively short period of time; pressure equalization is estimated to occur within a few milliseconds on account of pressure pulses being able to propagate at a velocity in an order of 250 meters/second within the volume 120. The wheel 10 has a diameter in the order of 1 meter.

Figure 6:
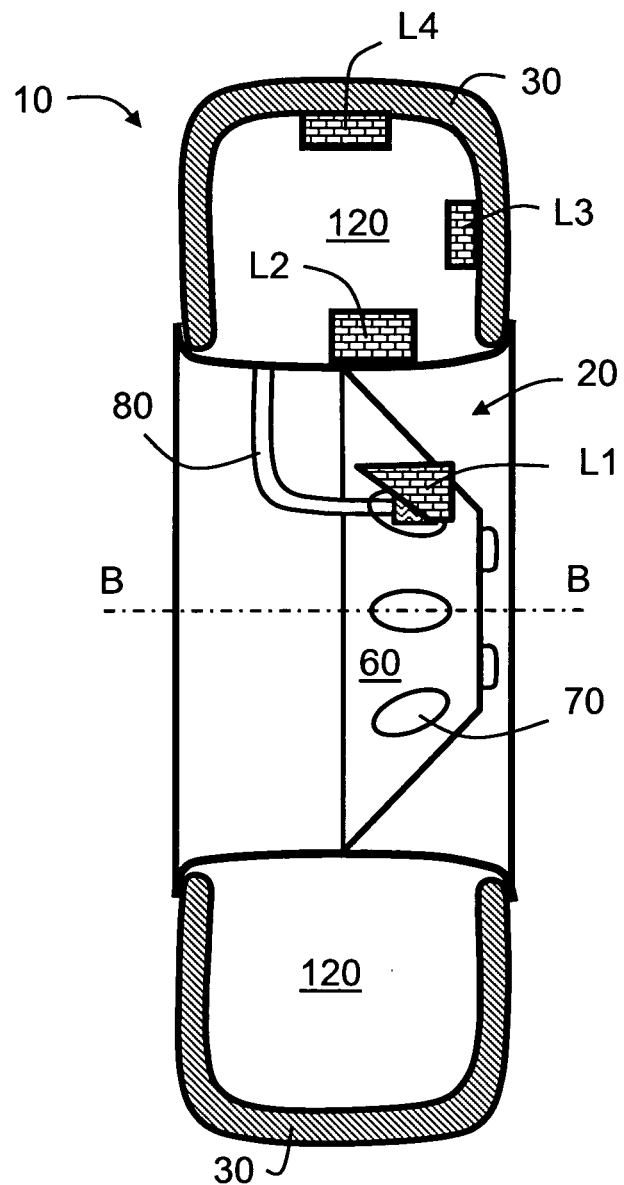
FIG. 6 is a schematic cross-sectional view of the wheel of FIG. 1 illustrating potential locations for mounting monitoring modules pursuant to the present invention; the potential locations include hub-mounting at a location L1, hub rim-mounting at a location L2, in-tire mounting at a sidewall location L3, and in-tire at a rim location L4.

FIG. 6 illustrates schematically categories of locations whereat sensors are beneficially mounted to the wheel 10. When several sensors are included at each category of location, the several sensors are beneficially distributed at positions angularly distributed around the wheel 10 for providing most representative information indicative of operation of the hub 20 and its tire 30.

At a location L1, fasteners are beneficially employed to attach a first sensor module to the hub 20 or even via one or more of the holes 50 to the axle 110. The first sensor module is capable of monitoring the tire pressure P by way of fluid (air or gas) communication to the valve 80, is capable of monitoring a temperature $T_{hub}$ of the hub 20 and is capable of sensing accelerations A in one-, two- or three-orthogonal axes (x, y, z) at the hub 20 depending upon type of accelerometer employed. Beneficially, one or more of a pressure sensor and an accelerometer included in the first sensor module for performing measurements are silicon micromachined integrated electronic components contemporarily known as MEMS ("Micro-Electronic Mechanical Systems"). The temperature $T_{hub}$ of the hub 20 will often be different from the temperature $T_{tire}$ of the tire 30; a temperature $T_{mod}$ measured at the first module is hence not ideally representative of the tire 30 temperature $T_{tire}$ and thus condition of the tire 30; the hub 20 will often be subject to direct cooling air flows, and during braking events will be heated up rapidly by warm air flowing from the associated disc brake 115 which, as elucidated in the foregoing, can be subject to sudden peak dissipations of energy of many kiloWatts, for example during and shortly after performing emergency braking. The first module at the location L1 is not totally screened by conductive components which renders short-distance wireless communication possible between the first module and an electronic control unit (ECU) or electronic management system of the vehicle. The first sensor module at the location L1 is most accessible and susceptible to being retrofitted to vehicles with minimal mechanical changes being required.

Figure 7:
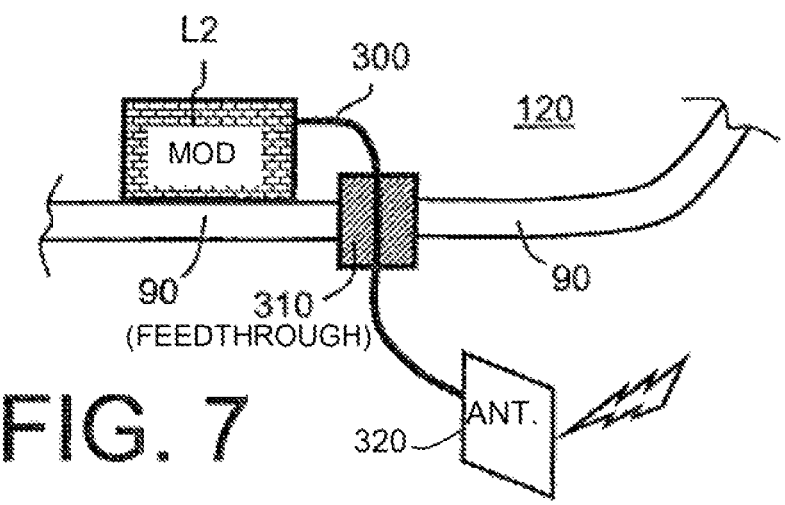
FIG. 7 is a schematic cross-sectional view of a tire of the wheel of FIG. 1 with its monitoring module mounted at a location L2 on a rim of a hub of the wheel with a wire connection from the module to a patch antenna exposed on the hub.

A second sensor module is beneficially mounted to an inside surface of the rim 90 at a location L2 and thereby is subject directly to the pressure P developed within the tire 30 in operation. The second module at this location L2, when measuring the temperature $T_{mod}$ thereat, is capable of providing an accurate measurement of the temperature $T_{tire}$ of the tire 30 as well as the aforesaid pressure P. Moreover, one or more accelerometers included within the second module for measuring the acceleration A at the location L2 are at a greater radial distance from the axis B-B (see FIG. 2) than the first module at the location L1, and are therefore subject to greater radial components of acceleration resulting from rotation of the wheel 10. A disadvantage of mounting the second sensor module at the position L2 is that the mesh 210 in combination with the rim 90 have a tendency to form a Faraday cage which severely attenuates wireless transmissions from the second module, unless the second module has an antenna exit through the rim 90, for example a small air-tight hole through which an antenna wire coupled to the second module at the position L2 is extended out onto the frusto-conical web 60 for enhancing wireless communication efficiency. In FIG. 7, there is shown an example wherein the second module at the location L2 is coupled via an antenna wire 300 through an insulated feed-through 310, installed in the rim 90 and operable to withstand the pressure P, to a film metal patch antenna 320; optionally, the patch antenna 320 is affixed to the frusto-conical web 60 for mechanical protection. Alternatively, or additionally, the second module at the location L2 is electrically coupled to the mesh 210 of the tire 30 and is operable to employ this mesh 210 as an antenna for communicating by wireless to the aforesaid electronic control unit (ECU) or an electronic vehicle management system. As a yet further alternative, the second module at the location L2 can be directly electrically coupled by wire through the feed-through 310 or by conductive film connection to the first module and optionally derive power therefrom as well as communicating measurement data thereto.

Figure 8:
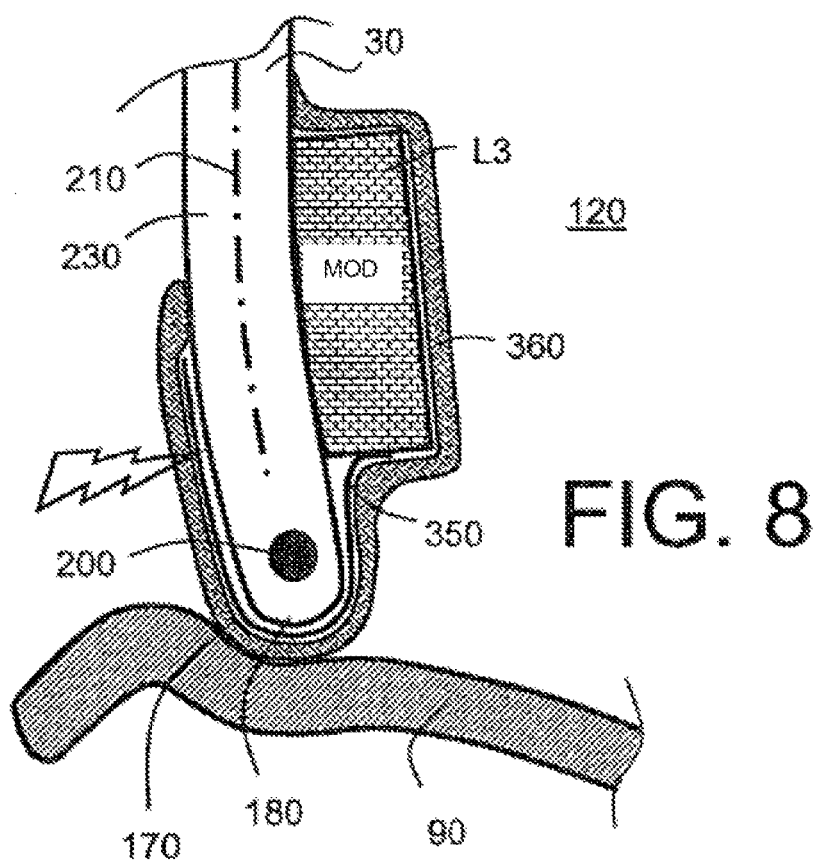
FIG. 8 is a schematic cross-sectional view of a tire of the wheel of FIG. 1 with its monitoring module mounted at a location L3 on the tire, the module being provided with a film antenna wrapped around an edge of the tire and exposed on an exterior surface of the tyre.

A third sensor module is beneficially mounted on an inside surface of the tire 30 at a location L3, for example by bonding the third module onto the tire 30 using rubber or plastics material bonding agents or similar before the tire 30 is mounted to the hub 20; alternatively, use of snap-type press-fit mounting of the third sensor module to the tire 30 is also feasible and faster to employ when manufacturing and servicing the tire 30. The third module at the location L3 is capable of measuring the temperature $T_{mod}$ thereat and thereby providing a direct representative indication of tire temperature $T_{tire}$, a representative direct indication of the pressure P and is also able to provide an representative indication of flexural characteristics of the walls 230 of the tire 30 by way of acceleration A measurements or strain gauge measurements; however, the acceleration signals generated by the third module at the location L3 are a complex modulation of various acceleration components as the wheel 10 rotates in operation and its side walls 230 flex, whereas the accelerometer of the first module mounted at the location L1 is operable to generate acceleration signals which include a relatively greater magnitude of linear acceleration components therein which renders the first module at the location L1 potentially better suited for monitoring such linear acceleration components. Optionally, the third module at the location L3 is also coupled to one or more resistive-film or fibre-optical strain gauge sensors (not shown) coupled onto or even embedded within the rubber material of the tire 30, for example onto the side wall 230 and/or peripheral rim of the tire 30. The third module mounted at the location L3 suffers a similar wireless communication problem to the second module at the location 12 in that the mesh 210 in combination with the rim 90 functions as a Faraday cage to attenuate wireless communication from the volume 120 within the tire 30. In order to improve wireless communication, the third module at the location L3 is optionally provided with a thin-film conductive antenna 350, for example fabricated by metal film sandwiched between layers of flexible insulating material such as Kapton as illustrated in FIG. 8. The antenna 350 is beneficially wrapped around the inner edges 180 and up around an outside wall surface of the tire 30. The second module at the location L2 is also susceptible to being provided with such a thin-film antenna, for example disposed over an edge of the rim 90 and even extending onto the frusto-conical web 60. However, such thin-film antennas are susceptible to being damaged when the tire 30 is installed onto the hub 20 unless adequately protected with a rubber protective film 360 or similar component added to provide mechanical protection. Alternatively, or additionally, the third module is susceptible to having its antenna coupled electrically to the mesh 210 of the tire 30 which is then capable of functioning as an antenna; the third module is beneficially provided with an electrical piercing pin for penetrating during installation through an inside of the side wall 230 for providing an electrical connection to the conductive mesh 210. Yet alternatively, the second module at the location 12 can be operable to function as a wireless relay node for conveying signals from the third module via the second module to an electronic control unit (ECU) of the vehicle; such nodal communication between modules mounted onto the wheel 10 will be elucidated in more detail later and corresponds to the modules cooperating to form a communication network.

A fourth module is optionally included at a location L4 on an inside rim of the tire 30 as illustrated in FIG. 6. Generally similar considerations for the module mounted at the location L3 also pertain for the module at the location L4. However, the module at the location L4 is exposed to extreme mechanical stress in use.

Figure 9:
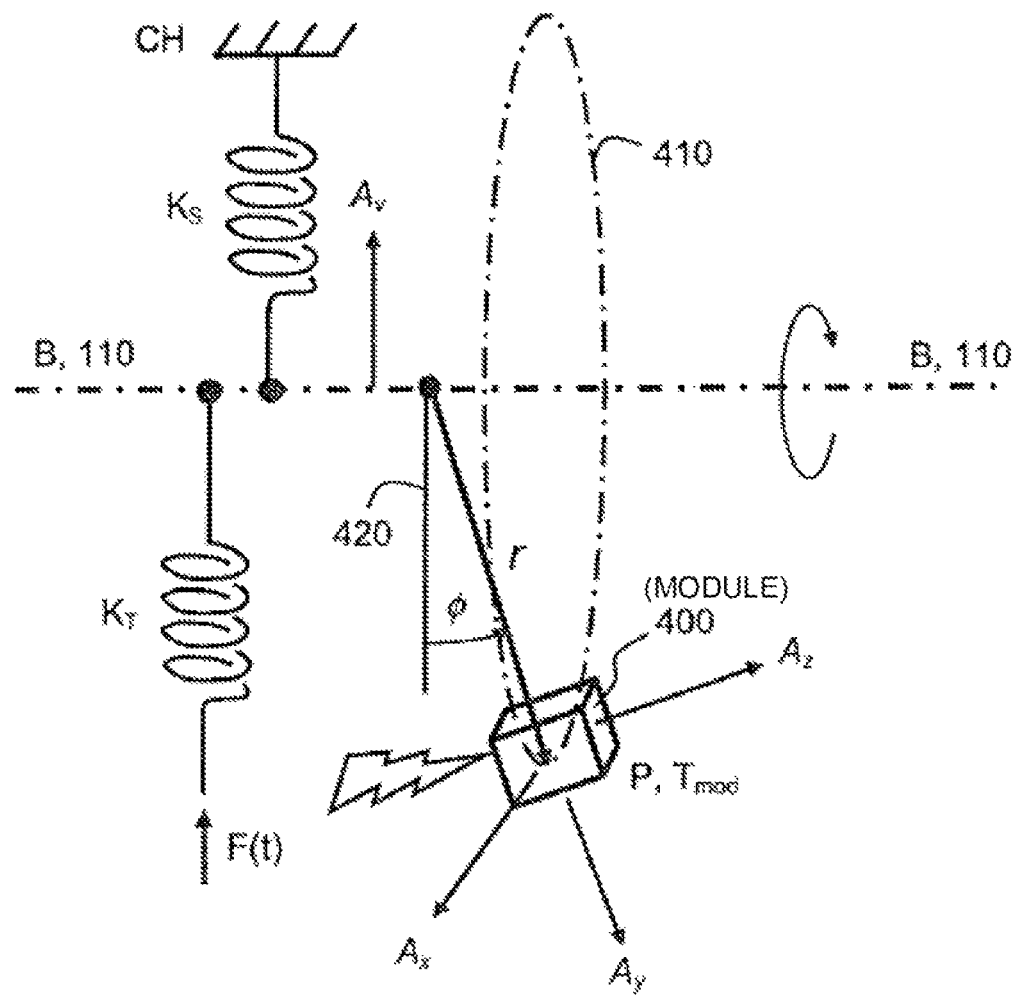
FIG. 9 is a schematic diagram illustrating spatial movement of a monitoring module mounted on the wheel of FIG. 1, together with a representation of a spring suspension together with a representation of forces acting upon the wheel when in operation.

Measurement signals generated by the first, second and third modules at the locations L1, L2 and L3 respectively will now be further elucidated with reference to FIG. 9.

2. Wheel-Mounted Module Pursuant to the Present Invention

In FIG. 9, there is shown the axis of rotation B-B around which the wheel 10 revolves in operation. The wheel 10 is provided via the axle 110 with a leaf spring and/or air pneumatic suspension coupled to a chassis CH of the vehicle; the suspension is denoted by a spring constant $K_S$. Forces applied to the tire 30 from a road surface in contact with the tire 30 are denoted by a force F(t); the tire 30 has a spring compliance described by a spring constant $K_T$ which is dependent on the pressure P within the tire 30 and also mechanical design of the tire 30. The first, second and third sensor modules at the locations L1, L2 and L3 respectively are each denoted by a module 400 which circumscribes in operation a radial path denoted by 410 when the wheel 10 rotates around the axis B-B corresponding to the axle 110. The radial path 410 has a radius r and the module 400 is inclined at an inclination angle ϕ relative to a normal radial direction 420. The module 400 is operable to measure at least one of:

(a) a temperature $T_{mod}$ at the module 400;
(b) the pressure P at the module 400; and (c) linear acceleration in one or more axes x, y, z as, for example, illustrated in FIG. 9, wherein the z-axis is parallel to the axis B-B when the inclination angle φ is 0 degrees, the y-axis corresponds to a radial direction for the wheel 10 when the inclination angle φ is 0 degrees, and the x-axis corresponds to a tangential direction whose associated acceleration is weakly affected by the inclination angle φ when near 0 degrees.

Beneficially, the module 400 at least measures the pressure P. When the module 400 is mounted at the location L1, it measures the pressure P of the tire 30 via its valve 80.

As elucidated in the foregoing, the module 400 is optionally furnished with other types of sensors, for example resistive strain gauges, piezo-electric strain gauges, moisture sensors, and so forth if desired. It is convenient, for identifying location of one or more modules 400 on a vehicle, that the module 400 is provided with a magnetic sensor, for example implemented using a magnetic reed-relay switch operable to electrically conduct when a permanent magnet having, for example, a near-field magnetic field strength of 100 milliTesla is placed in near proximity to the module 400, for example within a distance of 10 cm therefrom; the module 400 is thereby capable of making its identity known when interrogated by a magnet.

With reference to FIG. 9, when the wheel 10 rotates at a constant angular rate to, and the inclination angle φ is substantially 0 degrees, the acceleration $A_x$ measured by the x-axis accelerometer is given by Equation 1 (Eq. 1):

$$A_x = g \sin(\omega t + \lambda) \quad \text{Eq. 1}$$

wherein
$A_x$=an x-axis acceleration measurement;
r=a radius from the axis B-B at which the module 400 is mounted;
ω=an angular rotation rate of the wheel 10;
g=a gravitational constant (circa 10 m/s/s); and
λ=an angular offset.

When the wheel 10 rotates at the constant angular rate ω, and the inclination angle φ is substantially 0 degrees, the acceleration $A_y$ measured by the y-axis accelerometer is given by Equation 2 (Eq. 2):

$$A_y = r\omega^2 + g \sin(\omega t + \lambda) \quad \text{Eq. 2}$$

wherein
$A_y$=a y-axis acceleration measurement;
r=the radius from the axis B-B at which the module 400 is mounted;
ω=the angular rotation rate of the wheel 10;
g=the gravitational constant (circa 10 m/s/s); and
λ=an angular offset.

Beneficially, the wheel 10 when mounted on its axle 110 is provided with the aforementioned ABS angular sensor encoder 118 for measuring the positional angle Θ of the wheel 10 and the angular turning rate w=dΘ/dt of the wheel 10. Disparity of the measured acceleration $A_x$ from Equation 1 with measurements from such an ABS sensor encoder 118 is susceptible to being used detect one or more of:
(i) detecting malfunction of the ABS sensor encoder 118; and
(ii) slip of the tire 30 relative to the hub 20, especially pertinent when sensing at the location L3 (although this slip only exceptionally occurs usually with catastrophic results).

Assuming such an ABS encoder sensor 118 is functioning correctly, checking the acceleration $A_x$ against change in turning angle Θ determined by the ABS sensor encoder 118 can be, for example, employed to dynamically confirm correct operation of the module 400. Such dynamic confirmation of correct module function is a feature provided by the present invention.

The module 400 is also capable of measuring accelerations $A_y$ and $A_z$ in substantially y- and z-directions respectively when the inclination angle φ is non-zero which is, for example, pertinent for the third module at the location L3 when the wall 230 of the tire 30 flexes, or at the locations L1 and L2 when the hub 20 is loose on its fasteners or skewed in relation to the axle 110. Measured acceleration signals are provided approximately as defined in Equations 3 and 4 (Eqs. 3 and 4):

$$A_z = (r\omega^2 + g \sin(\omega t + \lambda)) \sin \phi \quad \text{Eq. 3}$$

$$A_y = (r\omega^2 + g \sin(\omega t + \lambda)) \cos \phi \quad \text{Eq. 4}$$

For the locations L1 and L2, the inclination angle φ for the module 400 mounted in an orientation as depicted in FIG. 9 is normally substantially zero such that the acceleration $A_z$ is normally of a relatively small magnitude and the acceleration $A_y$ is a summation of forces arising from the force F(t) resulting from road surface characteristics, centrifugal components $r\omega^2$ arising from turning of the wheel 10 and the force of gravity g modulated by turning of the wheel 10. However, in an event of imbalance of the wheel 10 arising from the hub 20 becoming skewed, for example:
(a) due to loosening of the fasteners or bolts used to attach the hub 20 via its holes 50 to the axle 110;
(b) due to the hub 20 becoming deformed due to impact or accident or fracture, or
(c) the axle itself 110 being out of alignment due to fault or impact,
the inclination angle φ becomes a function of an angle of rotation Θ of the wheel 10 as defined by Equation 4 (Eq. 5):

$$\phi = \phi_{max} \sin(\omega t + \mu) \quad \text{Eq. 5}$$

wherein
$\phi_{max}$=a misalignment angle; and
μ=angular offset regarding rotation of the wheel 10,
such that Equations 3 to 5 are then susceptible to being used in combination for determining a nature of the measured accelerations $A_y$ and $A_z$ from the module 400 mounted at the locations L1 and L2. The acceleration signal $A_z$ is thus useful, pursuant to the present invention, for identifying angular misalignment or fastener problems by monitoring using modules 400 at one or more of the locations L1 and L2. However, the module 400 mounted at the location L3 is subject to considerable flexure of the wall 230 which tends to dominate in magnitude with regard to angular change over angular misalignment of the axle 110 or lateral wobbling of the wheel 10. Moreover, as elucidated in the foregoing, mounting the module 400 at the location L1 is beneficial for measuring the pressure P of the tire 30 from its valve 80, but the temperature $T_{mod}$ measured by the module 400 at the location L1 is not an accurate representation of temperature $T_{tire}$ of the tire 30 on account of intermittent heating of the brakes 115 in operation. Furthermore, mounting the module 400 at the location L2 is beneficial for measuring the pressure P of the tire 30, as well as measuring a representative operating temperature of the tire 30 (namely $T_{mod} = T_{tire}$ at the location L2).

When the module 400 is mounted at the location 13, it is capable of providing a representative measurement of the pressure P and the temperature of the tire 30 (namely $T_{mod} = T_{tyre}$).

However, periodic flexure of the wall 230 of the tire 30 when the module 400 is mounted at the location L3 results in the inclination angle φ being a strong function of the angle of rotation Θ of the wheel 30; the inclination angle φ then becomes substantially, to a first approximation, the flexural angle of the wall 230 of the tire 30. For the module 400 mounted at the location L3, the inclination angle φ then becomes a series function as defined in Equation 6 (Eq. 6):

$$\phi = \phi_0 + G(P) + H(P)\sum_{i=1}^{n}(k_i\sin(i(\omega t + \varepsilon_i))) \quad \text{Eq. 6}$$

wherein
$\phi_0$=angular offset;
G(P)=a function describing a change in angle of the wall 230 of the tire 30 as a function of changes in the pressure P therein for a portion of the tire 30 not in contact with a road surface;
H(P)=a function dependent on the pressure P describing an angular deflection of the wall 230 when its portion of tire 30 comes in contact with the road surface;
k=a harmonic coefficient;
i=a harmonic index number;
ω=the angular rate of rotation of the wheel 10; and
$\varepsilon_i$=an angular offset.

Figure 10:
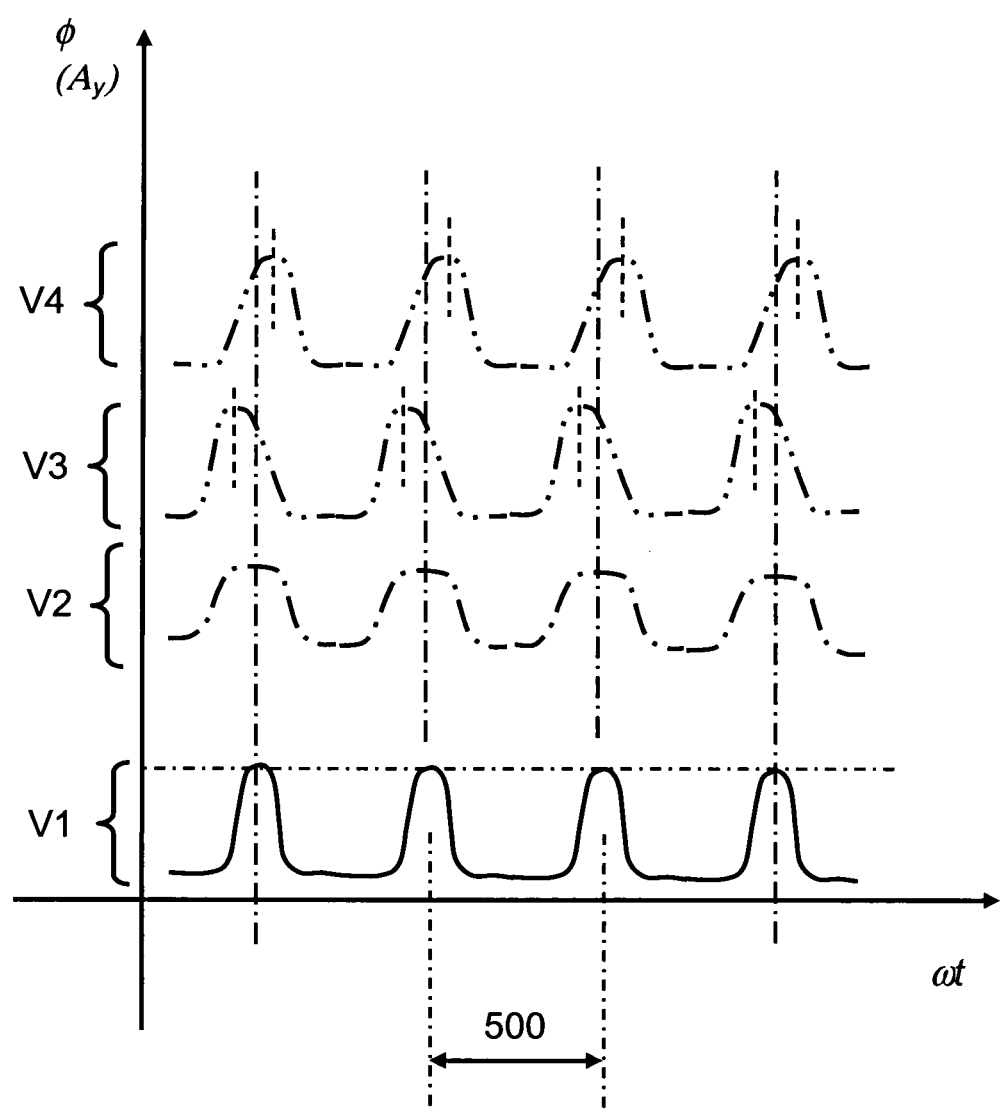
FIG. 10 is an graph illustrating a general form of acceleration signal obtainable in operation from the monitoring module mounted at the location L3 as shown in FIG. 6.

FIG. 10 provides in signal V1 a qualitative illustration of the angle φ when the module 400 is mounted at the location L3 and the wheel 10 is rotating; the inclination angle φ changes rapidly with flexure of the tire wall 230 when a portion of the tire 30 carrying the module 400 on its inside wall 230 comes into contact with a road surface. An abscissa axis in FIG. 10 represents the rotation angle Θ with time t, namely angle Θ=ωt; an ordinate axis in FIG. 10 represents substantially the wall inclination angle φ. A period 500 corresponds to one complete revolution of the wheel 10, namely ΔΘ=2π.

In a first analysis method pursuant to the present invention, expected performance characteristics of the tire 30 are computed and then compared against measured characteristics. The first method includes steps as follows:
(a) for a given type of tire 30 defining the angle $\phi_0$ and the functions G and H in Equation 5, for a given pressure P measured for the tire 30, for a given temperature $T_{tire}$ measured at the tire 30, and for a given angular rotation rate ω of the tire 30 determined for example from the aforesaid ABS encoder sensor 118, computing a corresponding expected simulated angle φ, and deriving therefrom a simulated magnitude of the acceleration $A_z$ as would be expected to be generated from the accelerometer included in the module 400 mounted at the location L3;
(b) sensing representative samples of the acceleration $A_z$ as measured by the module 400; and
(c) checking to determine whether or not the simulated and measured accelerations $A_z$ mutually differ by more than a predefined threshold amount; if they do not mutually substantially correspond, there is inferred therefrom that the tire 30 is potentially defective and needs to be replaced.

For example, it is potentially possible to identify degradation of the mesh 210 before failure of the tire 30 occurs in operation. Such simulation beneficially requires harmonic synthesis to be executed on computing hardware included within the module 400 and/or in an electronic control unit (ECU) of the vehicle to derive the simulated acceleration $A_z$.

In a second analysis method pursuant to the present invention, measured data representative of the acceleration $A_z$ occurring in operation at the tire 30 are sampled and then subject to harmonic analysis, for example by applying Fast Fourier Transform (FFT) or similar type of transform, to derive parameters therefrom and then comparing the computed parameters with those that are expected for the tire 30; if there is a mutual difference between the computed and expected parameters for the tire 30 by more than a predefined threshold amount, potential failure of the tire 30 can be detected and the tire 30 replaced if necessary. The second method includes steps as follows are executed:
(a) sampling signals generated by the accelerometer in the module 400 representative of the acceleration $A_z$ to provide corresponding sampled data, and then subjecting the sampled data to harmonic analysis, for example by way of an efficient Fast Fourier Transform (FFT) algorithm, to derive its harmonic content and hence a series of harmonic coefficients; optionally phase relationships between the harmonics, as denoted by $\varepsilon_i$ in Equation 6 (Eq. 6), are also computed for use when making a comparison; and
(b) from the harmonic analysis, in combination with a knowledge of temperature $T_{tire}$ and pressure P of the tire 30, determining a type of tire 30 present on the wheel 10, based upon a look-up reference list of tire characteristics such as suppleness and elasticity as well as tire wall shape and profile; and
(c) comparing the determined type of tire 30 with the actual identification of type for the tire 30; if there is mutual variance therebetween by more than a predefine threshold amount, the tire 30 is determined to be potentially faulty and potentially in need of being replaced.

When utilizing the aforesaid second method, in an event of the predicted tire and the actual tire 30 on the wheel 10 being mutually at variance, degradation or fault in the tire 30 can thereby be inferred therefrom. As will be elucidated later, it is beneficial that the module 400 when mounted on the wall 230 of the tire 30 as depicted in FIG. 8 be provided with a distinguishing identification code (ID). The code is beneficially indicative of the characteristics of the tire 30 to which the module 400 is attached at the position L3. The module 400 is operable to communicate the identification code (ID) by wireless to an electronic control unit (ECU) which is operable to execute the variance comparison. Beneficially, harmonic analysis is also applied to one of more of the acceleration signals $A_x$ and $A_y$ for further confirming reliability of the harmonic analysis executed pursuant to this second method.

Whereas the module 400 mounted at the location L3 is especially effective for detecting potential problems or defects arising in respect of flexure and dissipation within the tire 30, the module 400 mounted at the location L1 is especially effective for measuring variations in asymmetry in the wheel 10, and also for determining a type of asymmetry in the wheel 10 and its associated tire 30. Even more preferably for detecting imbalance and also type of imbalance in the wheel 10, the module 400 is mounted in a non-rotating manner onto the shaft 110 substantially corresponding to the axis B-B. However, more wheel diagnostic information regarding imbalance in the wheel 10 is susceptible to being derived when the module 400 is mounted onto the wheel 10 and operable to rotated with the wheel 10, preferably near its axis B-B of rotation, for example substantially at the location L1. As will be elucidated in more detail later, monitoring the pressure P as the wheel 10 rotates provides unexpectedly considerable additional information regarding performance of the tire 30, for example multi-lobed distortions of the tire 30.

In FIG. 10a a wheel 10 having a hub 20 at which a rim 22 for carrying a tire 30 is shown. A module 400 is mounted to the wheel 10, preferable at the rim 22 of a hub unit. The module can however assume any other location as generally described in the description for modules 400 having further features than an associated memory including a data field containing data relevant to the functional status of the tire and a flag, which can be set to indicate the validity of the data contained in said field.

In FIG. 10a a first embodiment of the invention is shown. A module 400 is provided with a pressure sensor 760 for measuring the pressure within the tire 10. A data processor 710 receives the pressure signal. The data processor 710 is arranged to communicate with a flag 722, which may assume the status "VALID" or "INVALID" to denote the validity or invalidity of data representing the functional status of the tire 10 to which the module 710 is associated. The data processor may advantageously be connected to an associated data memory 720 arranged in the module 710 to retrieve information from the memory and to store information thereon. A communication path 712 arranged in the module 710 between the data processor 710 and associated memory 720 should therefore be provided. Alternatively, communication to the memory 720 is made through an external communication path 732 between a central ECU 950 and the memory can replace the communication path 712 between the internally in the module arranged data processor 710 and the memory 720. Naturally, the memory can be accessible both via an external path 732' and an internal path 712.

The memory 720 includes a data field 720' containing data relevant to the functional status of the tire. The data field 720' may contain different types of data such as for instance a first subfield 720a containing information of tire slip curves; a second sub field 720b containing information of tire size; a third sub field 720c containing information of tire age, a fourth subfield 720d containing a record of the distance the tire has been used; a fifth subfield 720e containing record of samples of pressure measured by the pressure sensor; and or a sixth subfield 720f containing record of samples of the temperature measured by a temperature sensor mounted on said wheel for monitoring the temperature of the tire. Further data fields 720g may be added, such as for instance information relating a threshold value above which the data in said data field 720 containing data relevant to the functional status of the tire may be added, and or an identity ID of the module, which may be used of the CPU 950 to identify which module of a set of modules are attempting to communicate with the CPU 950. The memory may also include a field that represents the flag 722. Alternatively the flag 722 can be arranged by other hardware components such as for instance a switch.

The module may further comprise an energy source 700, which preferably is of the type described in relation to the further embodiments described in this description.

A wireless interface 730 is arranged for allowing the module to communicate to an externally arranged ECU 950.

The module may furthermore comprise other sensor means 762, such as a temperature sensor 765, a strain gauge sensor 780, an accelerometer 770, and/or a magnetic sensor.

In operation the flag is initially set to assume the status "VALID" as soon as the tire is mounted to the rim and is filled with air. The flag is set to be "VALID" by transmission of key code signal from an external signal generator, which may be controlled by the ECU 950 or by another independent processor. The pressure sensor 760 measures the pressure and the data processor 710 monitors the pressure to detect whether the pressure is above or below a threshold value. The threshold value is selected so that only clearly inappropriate pressure levels which either indicates that the tire has been removed (an absolute pressure level equal to atmospheric pressure) or that a pressure level where damage of the wheel is likely, that is either a pressure level indicating a puncture or a level where excessive wear of the tire will take place. Hence the flag will remain in its status "VALID" until the pressure falls below the threshold value, when the flag is set by the processor 710 to assume the value "INVALID".

In one embodiment of the invention the field 720' containing data relevant to the functional status of the tire includes a field 720g containing record of samples of pressure measured by the pressure sensor 760, and that said data processor 760 is operable to set said flag 722 to "INVALID" when said record of samples contains at least one sample below said predetermined threshold value.

When the flag 722 has assumed the status "INVALID" the data processor 710 is prevented to change said flag from "INVALID" to "VALID" unless a key code signal KS is received externally from the module. In the embodiment shown the key code signal is provided via the external ECU 950 arranged in the vehicle. Alternatively, the signal may be provided from a separate control unit. Consequently the data processor 710 is operable to change said flag from "INVALID" to "VALID" when the key code signal is received externally from the module.

The embodiment shown in FIG. 10c includes the same features as the embodiment in FIG. 10b, with the sole difference that the data processor 710 is arranged externally of the module. A wireless interface 730 is arranged to communicate with the externally arranged processor 710, which may be separate from or an integrated part of a centrally arranged ECU 950.

The embodiments shown in FIGS. 10a and 10b may further include features of other embodiments of the modules apparent from the description.

Figure 11:
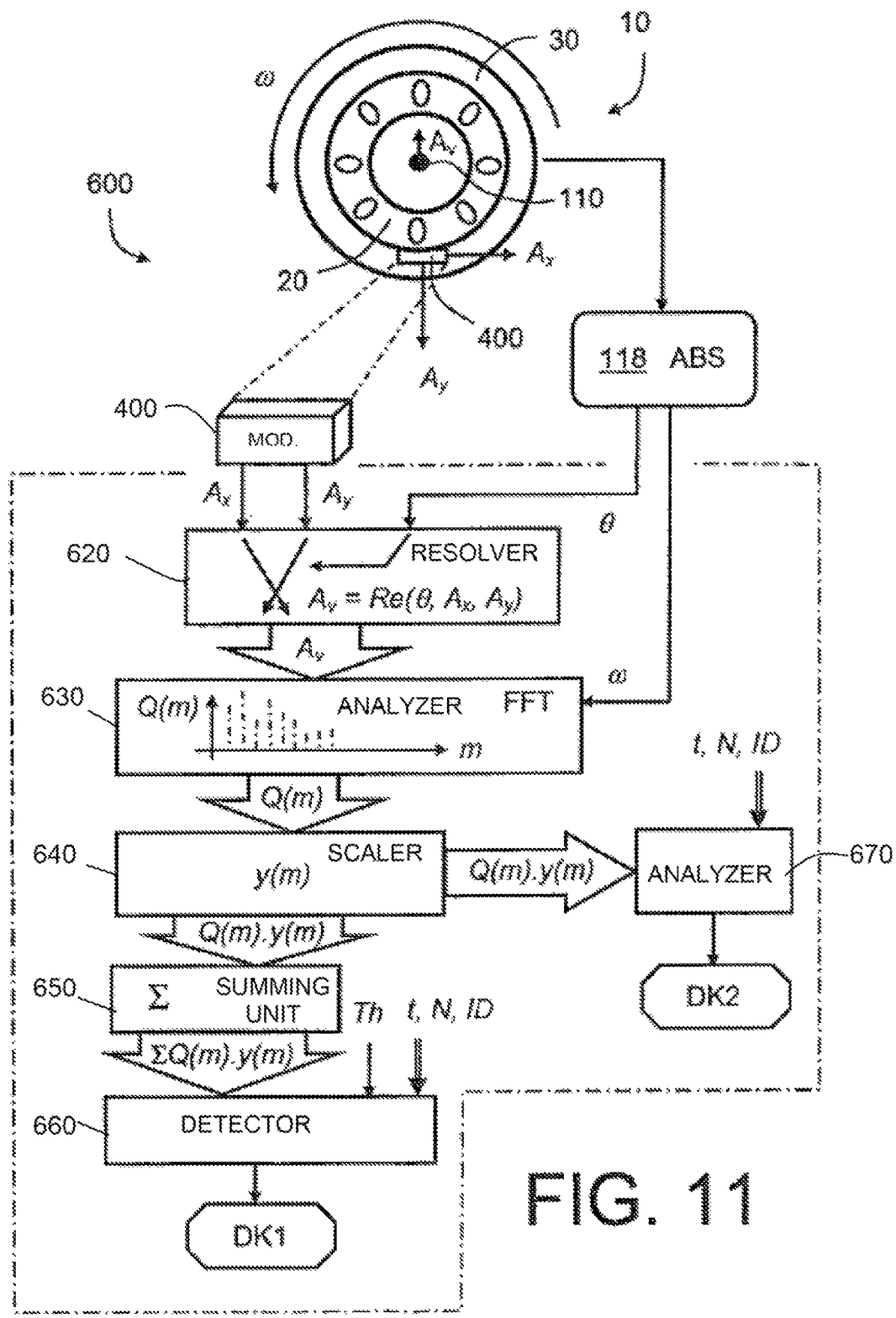
FIG. 11 is a first embodiment of a wheel- and tyre-monitoring apparatus pursuant to the present invention for use with the wheel of FIG. 1, the monitoring apparatus being operable to process acceleration signals.

Referring to FIG. 11, there is shown a data processing apparatus pursuant to the present invention indicated generally by 600; the data processing apparatus is operable to provide wheel- and tyre-monitoring. The data processing apparatus 600 is capable of being implemented in at least one of the module 400 and the aforesaid electronic control unit (ECU), depending upon where the processing is susceptible to being most conveniently and efficiently executed. Moreover, the processing apparatus 600 is susceptible to being implemented in at least one of hardware, and software executable in operation on computing hardware. The software is beneficially provided as a software product executable on the computing hardware. The software product is beneficially conveyed to the apparatus 600 on a data carrier; the data carrier is beneficially at least one of: a solid-state electronic data carrier, a wireless signal, an electrical signal, an optical-fibre signal, an optically and/or magnetically readable data carrier.

Under steady-state rotation of the wheel 10, namely with constant angular velocity $\omega$, temporal variations in the radial acceleration $A_y$, namely $dAy/dt$, are of substantially zero magnitude for the inclination angle $\phi$ being substantially zero, other than effects due to gravity g which are correlated with the rotation angle $\Theta$ of the wheel 10. Momentary acceleration generated from a road surface onto which the tire 30 contacts in operation results in the force F(t) as shown in FIG. 9 varying with time t and giving rise to varying components in a linear vertically-directed acceleration $A_v$ experienced at the axle 110 which are not correlated with periodic rotation of the wheel 10. However, components in the linear vertically-directed acceleration $A_v$ which correlate with rotation of the wheel 10, for example as referenced by way of the aforesaid ABS encoder sensor 118 providing an indication of the rotation angle Θ of the wheel 10 and its angular frequency of rotation ω, are of benefit for determining imbalance in the wheel 10, and also potentially elucidating a type of imbalance present in the wheel 10. The ABS encoder sensor and its associated signal processing circuits are denoted by 118 in FIG. 11. When one or more of the modules 400 are mounted onto the wheel 10 at one or more of the locations L1 to L4, they rotate in operation together with the wheel 10. In consequence, the one or more accelerometers in the one or more modules 400 measuring the accelerations $A_x$ and $A_y$ as depicted in FIG. 9 are all sensitive to linear vertically-directed acceleration in response to rotation of the wheel 10. In order to suitably condition the accelerations $A_x$ and $A_y$, it is necessary for the one or more modules 400 and/or an electronic control unit (ECU) in wireless communication therewith to perform angular resolving, for example as described in Equation 7 (Eq. 7):

$$A_v = d_1 \sin(\omega t) A_x + d_2 \cos(\omega t) A_y \quad \text{Eq. 7}$$

wherein
$d_1$, $d_2$ = scaling constants.

Such angular resolution is executed in operation in a resolver denoted by 620 in FIG. 11. The resolver 620 beneficially receives its angular reference for the rotation angle Θ from the ABS encoder sensor and its associated circuits 118. The resolver 620 is also beneficial in being operable to remove an angular dependent component in the acceleration $A_v$ due to gravity g which becomes constant in the resolved acceleration $A_v$. Removal of the acceleration component due to gravity g in the resolved acceleration $A_v$ is beneficial for auto-scaling the constants $d_1$ and $d_2$ in Equation 7 (Eq. 7) for a condition that the wheel 10 is known to be correctly in balance, for example during a calibration routine performed after the wheel 10 is newly installed on the vehicle.

By performing harmonic analysis on the signal representing the acceleration $A_v$ in respect of the angular frequency of rotation ω of the wheel 10, for example in a harmonic analyzer denoted by 630 in FIG. 11, the severity of the imbalance can be determined; for example, the amplitude of harmonics Q(m) wherein m is a harmonic number in the acceleration $A_v$ signal are beneficially individually scaled by a harmonic scaling function y(n) in a scaler 640 and then summed in a summing unit 650 to compute an aggregate $S_{tot}$ summed value. The aggregate value $S_{tot}$ is then compared in a threshold detector denoted by 660 against a predefined threshold value Th to determine whether or not the wheel 10 needs attention to correct the imbalance, for example by adding balancing weights or exchanging the tire 30. Equations 8 and 9 describe associated computing required:

$$S_{tot} = \sum_{m=1}^{t} Q(m) \cdot y(m) \quad \text{Eq. 8}$$

If $S_{tot} > Th$, then the wheel 10 needs attention  Eq. 9

Equation 9 corresponds to a decision point DK1 illustrated in FIG. 11.

Optionally, the harmonic scaling function y(m) implemented in the scaler 640 is made dependent upon a type of tire 30 installed on the wheel 10; for example, a robust knobbly tire installed on the wheel 10 is potentially able to exhibit a greater degree of imbalance before representing any form of potential risk than a lean high-performance high-speed tire optimized for reduced energy consumption during driving. Moreover, the harmonic scaling function y(m) implemented in the scaler 640 is beneficially also made a function of time t, namely y(m, t) in Equation 8, from an initial time $t_0$ at which the tire 30 was installed onto the hub 20. Furthermore, the harmonic scaling function y(m) is also beneficially made a function of the number of revolutions as determined from the ABS sensor encoder 118 that the wheel 10 has experienced since the tire 30 was installed thereon, namely y(m, N) where N is the number of revolutions of the tire 30. A reason for rendering the harmonic scaling function y(m, t) or y(m, N) variable is that imbalance in a well-worn tire 30 is more likely to potentially result in tire 30 failure in comparison to a newly-installed substantially unworn tire 30 whose internal mesh 210 has not been subjected to substantial work-hardening due to repetitive flexure.

The type of imbalance for the wheel 10 as determined from the amplitude of the harmonics Q(m) is determined from the relative amplitude of given harmonics; such determination is performed by harmonic analysis in an analyzer denoted by 670 in FIG. 11. Moreover, such harmonic analysis is beneficially implemented using a set of software rules, by applying a harmonic stencil to the harmonics to identify a signature of a specific type of imbalance present, or by feeding data indicative of the amplitude of the harmonic Q(m) into a neural network trained to recognize occurrence of certain types of defects. One or more of the software rules, the harmonic stencil and the neural network are beneficially optionally rendered dependent upon a type of tire 30 installed onto the hub 20. Moreover, one or more of the rules, the harmonic stencil and the neural network are also beneficially optionally dependent upon an age and/or a degree of wear of the tire 30. When computing relative amplitude of harmonics Q(m) present in the acceleration $A_v$, normalization of the amplitude of the harmonics Q(m) is beneficially implemented as a part of signal processing employed as depicted in FIG. 11.

For example, when fasteners in the aforementioned holes 50 attaching the hub 20 to the axle 110 have been inadequately tightened or work loose such that the hub 20 rattles around on its axle 110, the suspension of the vehicle, for example as denoted by the spring $K_s$ in FIG. 9, is often so effective that the driver of the vehicle is unaware of there being any problem. The hub 20 slopping around on its bolts or fasteners gives rise to sudden small jolts of the wheel 10 as the wheel 10 rotates; it has even been known for the frusto-conical web 60 to generate a bell-like ringing tone as it is pulse excited into resonance corresponding to a "cos 2Θ mode" of flexure, namely hoop-like deformation of the rim 90 and the frusto-conical web 60. These small sudden jolts give rise to signal energy in relatively high harmonics, for example in a range of $10^{th}$ to $20^{th}$ harmonic in the harmonics Q(m), which the scaling function y(m) can be arranged to isolate for specifically detecting that the wheel 10 is loose on its fasteners for warning the driver of the vehicle.

Beneficially, several different scaling functions y(m) are applied concurrently to the harmonics Q(m) so that occurrences of several different types of imbalance are monitored simultaneously by the data processing apparatus 600.

Figure 12:
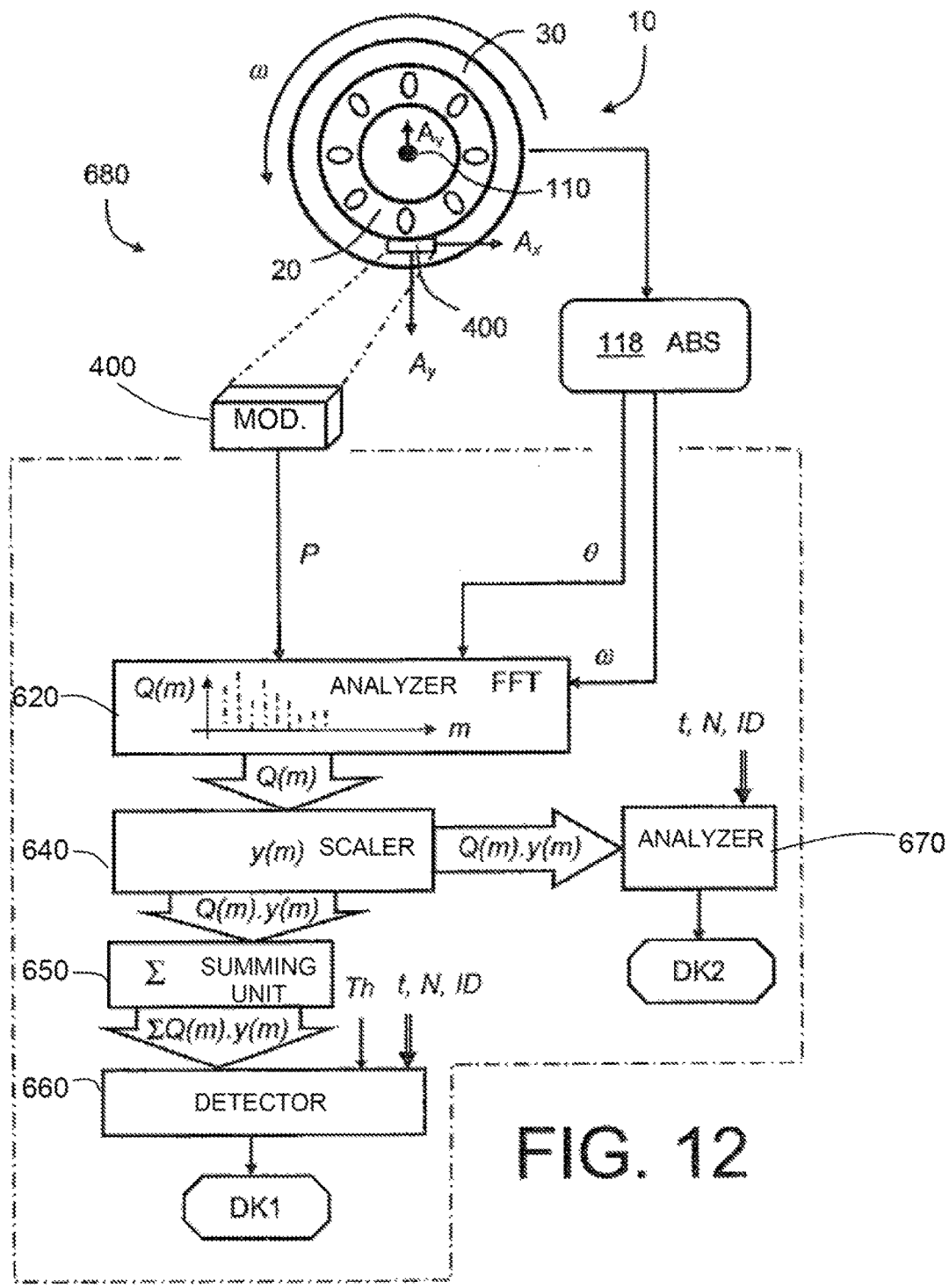
FIG. 12 is a second embodiment of a wheel- and tyre-monitoring apparatus pursuant to the present invention for use with the wheel of FIG. 1; the monitoring apparatus being operable to process pressure signals.
Figure 13:
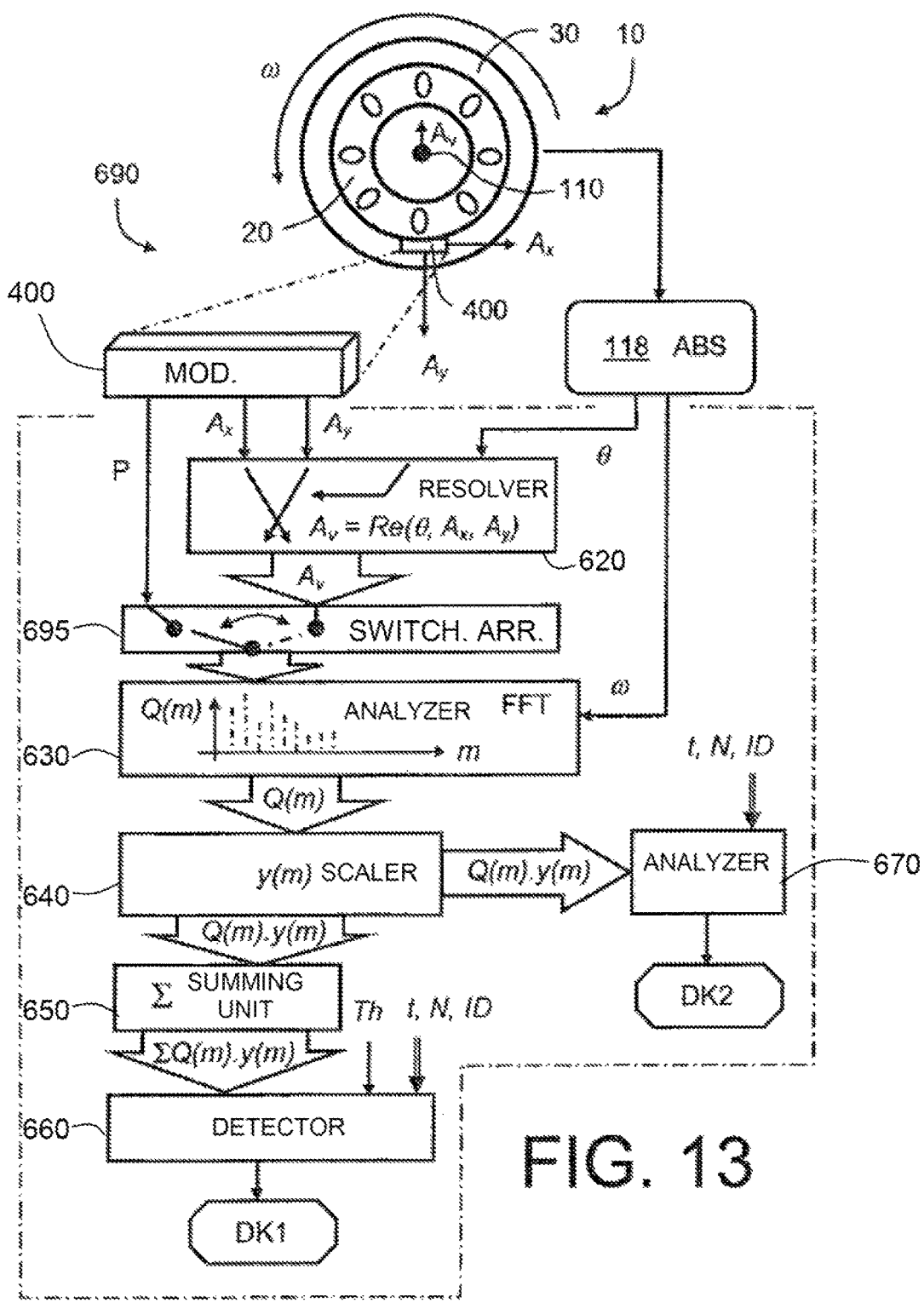
FIG. 13 is a third embodiment of a wheel- and tyre-monitoring apparatus pursuant to the present invention for use with the wheel of FIG. 1, the monitoring apparatus being operable to process both acceleration and pressure signals.

In an alternative, or additional, implementation of the data processing apparatus 600, the pressure P measured by the module 400 is provided to the harmonic analyzer 630 instead of the resolved acceleration $A_v$ in a manner as depicted in FIG. 12; in FIG. 12, the data processing apparatus 600 adapted to harmonically analyze the pressure P is indicated generally by 680. Irregularities in the tire 30, for example local bulges or weaknesses causing blisters in the tire 30, are manifest as pressure pulses at certain angular Θ positions as the wheel 10 rotates in operation. By analyzing variations in the pressure P as a function of rotation angle Θ of the wheel 10, namely components of the pressure P correlated with turning rate ω, it is feasible to provide additional monitoring of the tire 30 for improving detection of defects, or potential defects, in the tire 30. The data processing apparatus 680 functions in a generally similar manner to the data processing apparatus 600 except that the pressure P is analyzed instead of the acceleration $A_v$. Optionally, a data processing apparatus pursuant to the present invention is provided by combining together the data processing apparatus 600, 680 so as to provide for concurrent or periodically alternating harmonic analysis and monitoring of the acceleration $A_v$ and the pressure P as depicted in FIG. 13 and as indicated by 690 therein; there is provided a switching arrangement 695 in the data processing apparatus 690, either implemented in software or hardware, for selecting between the pressure P and the acceleration $A_v$. An advantage of the data processing apparatus 690 illustrated schematically in FIG. 13 is that more comprehensive monitoring to the wheel 10 is susceptible to being achieved in operation.

Aforementioned analysis of flexure of the wall 230 of the tire 30 as sensed by the module 400 mounted at the location L3 is beneficially compared in the electronic control unit (ECU) and/or within the module 400 with results from harmonic signal analysis performed in respect of one or more modules 400 positioned at one or more of the locations L1 and L2. In an event that the comparison is such that the modules 400 located at mutually different locations L1 to L4 give rise to mutually conflicting analysis results, there is a high likelihood of potential problems with the wheel 10 and/or its tire 30; a warning message is beneficially then transmitted from the data processing apparatus 600, 680 or 690 as appropriate to a driver of the vehicle and/or to a control centre of the enterprise operating a fleet of such vehicles that there is a need to perform maintenance on the vehicle, for example for devising logistics for a future maintenance schedule for the vehicle. Such logistics can include, for example, prearranging a replacement wheel to be available and informing a service facility regarding a time of arrival of the vehicle for maintenance purposes so that appropriate task scheduling at the service facility can be implemented.

One or more of the modules 400 mounted at one or more of the locations L1 to L4 are susceptible to being used, optionally in communication with an electronic control unit (ECU), to detect more gradual temporal changes in the tire 30, for example a gradual reduction in pressure P due to a slow leak therefrom, for example over a period of several weeks or months. Moreover, the one or more modules 400, optionally in cooperation with the aforesaid electronic control unit (ECU) in wireless communication with the one or more modules 400, can be used to monitor sudden depressurization of the tire 30, for example sudden depressurization and subsequent re-pressurization associated with installing a new replacement tire 30 onto the hub 20. Monitoring of such sudden depressurization is important when an earlier tire 30 equipped with a module 400 mounted therein is exchanged for a replacement tire 30 devoid of any such module 400, so that parameters for various signal processing functions as depicted, for example, in FIG. 11 can be appropriately selected by the apparatus 600, 680 or 690. When the identity and condition of the tire 30 is not reliably known, there are beneficially adopted in the data processing apparatus 600, 680 or 690 default values for parameters indicative of a tire 30 with a substantially medium degree of tread wear. Beneficially, there is issued a message "not reliable information" or similar in an event of such sudden depressurization having been detected to alert the driver that the electronic control unit (ECU) is being supplied with potentially non-representative information. Such a situation can arise when unauthorised swapping of the tire 30 or a tampering event involving the tire 30 has occurred for example.

The module 400 is beneficially operable to monitor and record a temporal data log in its memory of the pressure P, even when the wheel 10 including the module 400 is removed from the vehicle, for example for storage or service. In this context, hibernating modes of the module 400 are of benefit as will be elucidated later for enabling such temporal data logs to be recorded over long periods of time, for example over a period of several months.

Figure 14:
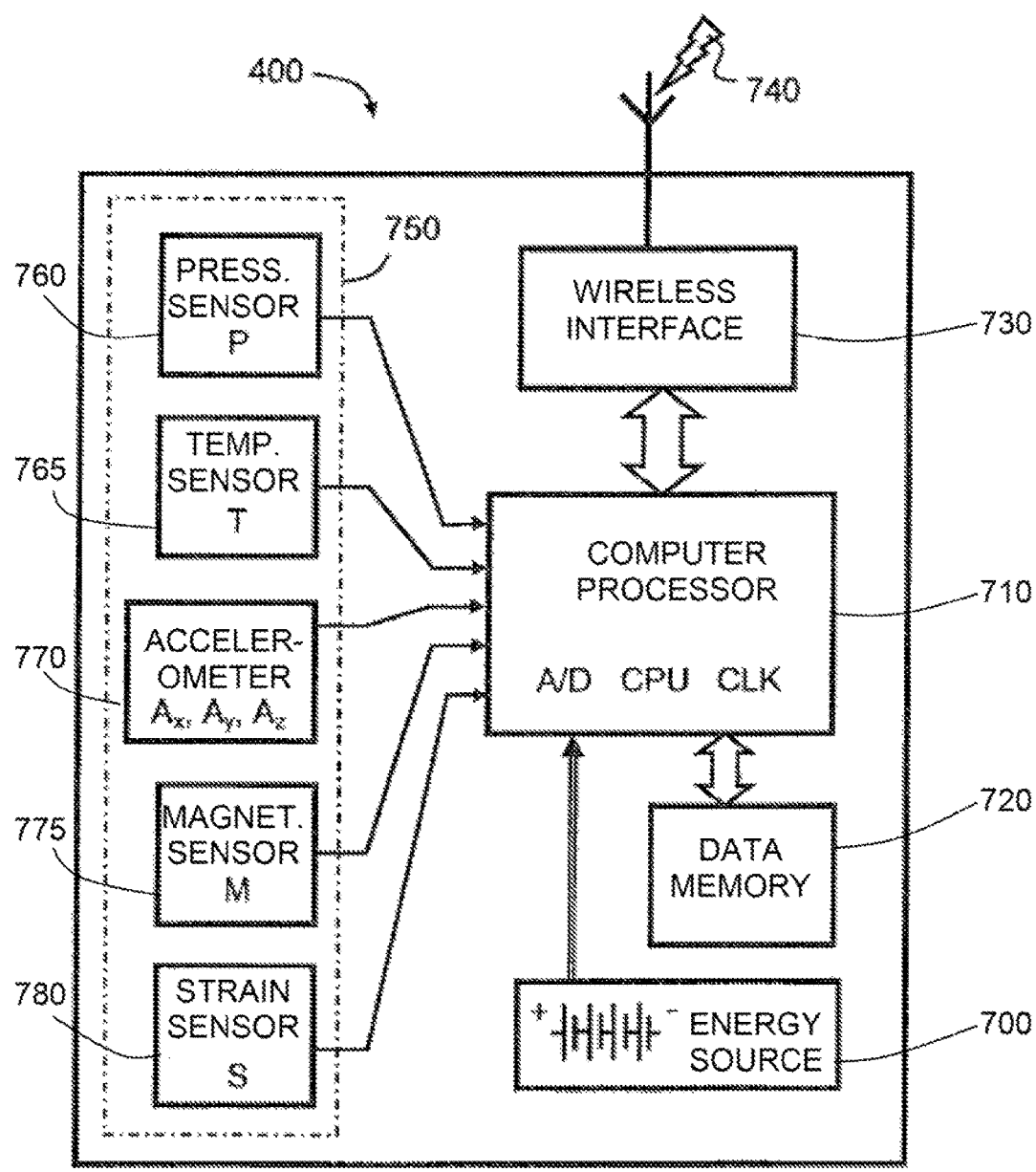
FIG. 14 is a schematic diagram of a monitoring module operable to be mounted onto the wheel of FIG. 1 and to sense operation characteristics of the wheel 10.

The module 400 will now be described in overview with reference to FIG. 14. In operation, the module 400 is required to be robust and also inexpensive in manufacture. Moreover, for example when mounted in the aforesaid locations L3 and L4, the module 400 is relatively inaccessible and needs to function reliably without user intervention. Beneficially, the module 400 utilizes aforesaid microelectronic mechanical systems (MEMS) technology, for example based upon silicon micromachining fabrication processes. The module 400 includes a battery 700 comprising one or more electro-chemical cells operable to provide electrical power, amongst other components, to a computer processor 710. A data memory 720 including a software product is coupled in communication with the processor 710; the software product comprises software code which is executable upon the processor 710 and which is operable to coordinate functioning of the module 400. The processor 710 has associated therewith a clock (CLK) and an analogue-to-digital (A/D) converter for converting analogue sensor signals to corresponding sampled sensor data; beneficially, the analogue-to-digital (A/D) is based upon a high-speed multi-channel sigma-delta type converter which exhibits modest power consumption. Sigma-delta converters are contemporarily employed in power-critical devices such as miniature hearing aids which are battery powered and need to function for long periods without attention, for example for battery change. The module 400 further comprises a short-distance wireless interface 730 for providing bidirectional communication to and from the module 400; the wireless interface 730 is beneficially implemented using contemporary Blue Tooth, Weebre or similar wireless interface technology operating pursuant to associated standardized communication protocol.

As elucidated earlier, the module 400 is implemented to operate when its wheel is installed on the vehicle and also when removed therefrom. The module 400 is therefore able to detected any sudden depressurization of the wheel occurring when the wheel 10 is temporarily removed from its vehicle. In this respect, as elucidate in the foregoing, the module 400 is able to provide for detection of tampering events.

The module 400 also includes an array of one or more sensors denoted by 750 whose corresponding one or more outputs are coupled to the aforesaid A/D converter. Depending upon intended location of the module 400, namely locations L1, L2, L3 or L4, and a degree of wheel monitoring functionality desired, the array of sensor 750 includes one or more of:

(a) a pressure sensor 760 beneficially based upon a MEMS structure including a silicon micromachined membrane with strain-gauge or oscillatory resonant signal read-out;

(b) a temperature sensor 765 for measuring an air or surface temperature in proximity of the module 400, wherein the temperature sensor 765 beneficially has a measuring range of −40° C. to +100° C.;

(c) an accelerometer 770 beneficially implemented in as MEMS structure including one or more silicon micromachined proof masses on a spring suspension with corresponding position readout for the one or more proof masses indicative of acceleration; optionally, for enhanced accuracy and response, the accelerometer is a force-feedback type accelerometer; the accelerometer 770 is beneficially sensitive to acceleration in one-, two- or three orthogonal axes. For best monitoring of wheel 10 and associated tire 30 operation, the accelerometer 770 is implemented as a three-axis accelerometer:

(d) a magnetic sensor 775, preferably implemented as a vacuum-encapsulated reed relay switch but also susceptible to being implemented as an Hall-effect device; the magnetic sensor 775 is optionally included for activating the module 400 using a strong magnetic brought into proximity of the module 400; however, as will be elucidated in more detail later, other approaches to activating the module 400 are also possible and are pursuant to the present invention; and (e) a strain-gauge sensor 780 which is most potentially pertinent to the module 400 when mounted at the location L3 onto the wheel 10. The sensor 780 can be affixed to the tire 30 prior to the tire 30 being installed onto the hub 20.

Optionally, the module 400 is susceptible to including other types of sensor not described in detail above.

Optionally, the battery 700 is, at least in part, a rechargeable battery and provided with its own electro-magnetic recharging device actuated in response to rotation of the wheel 10 in operation, for example in a manner akin to an automatic wind-up mechanical wrist watch wherein wrist movement is operable to move an imbalance mass to provide watch-spring wind-up energy. Alternatively, or additionally, piezo-electric recharging of the battery 700 in response to rotation of the wheel 10 can be employed.

In operation, the computer processor 710 is operable to perform self-diagnostics and send a warning message via its wireless interface 730 in event of partial or total malfunction occurring within the module 400, and a confirmatory message sent when the module 400 is fully functional; in an event that the module 400 malfunctions, its associated vehicle is not immobilized, but merely results in reduced functionality in respect of wheel and associated tire monitoring. Beneficially, the driver of the vehicle can be informed via the electronic control unit (ECU) regarding reduced functionality and provided with a choice whether or not to continue driving despite malfunctioning of the module 400.

In operation, when the computer processor 710 detects that the signals from the accelerometer 770 are substantially constant for more than a predefined time period, for example for a time period in a range from a few seconds up to 10 minutes, after cessation of a period of rotation of the wheel 10, the computer processor 710 is beneficially operable to cause the module 400 to assume a hibernating mode to conserve power during which the wireless interface 730 is substantially de-energized. During the hibernating mode, the computer processor 710 is beneficially operable to periodically and momentarily activate the wireless interface 730 for short periods to detect "wake-up" commands from the electronic control unit (ECU) of the vehicle. As soon as the computer processor 710 detects that signals from the accelerometer 770 and/or the pressure sensor 760 are temporally varying, for example during a pre-defined time period, the processor 710 is operable to switch the module 400 to its active state, namely non-hibernating, with all its functional parts as shown in FIG. 14 brought into operation. Alternatively, or additionally, the module 400 can be explicitly set in a hibernating mode on receipt of a specific hibernate instruction from the electronic control unit (ECU) 950; beneficially, the specific instructions includes the identification code (ID) of the module 400 which is to assume such a hibernating state; similarly, the module 400 can be explicitly instructed to assume a functional active state, namely non-hibernating state, by receiving a specific wake-up instruction from the electronic control unit (ECU) 950. Yet alternatively, or additionally, all the modules 400 included on the wheels 10 of the vehicle can be set to a hibernate state, or set to a functional active state, by a general explicit instruction wirelessly transmitted from the electronic control unit (ECU) 950; the general explicit instruction is beneficially sent by the electronic control unit (ECU) 950 in response to the driver of the vehicle starting and stopping a combustion engine or an electric traction motor of the vehicle. Such an electric traction motor is relevant when the vehicle has a hybrid powertrain or an electric power train provided with electric power from fuel cells.

When considerable data processing is performed within the module 400 so as to distribute computing load around the vehicle, for example signal processing involving application of a Fast Fourier Transform (FFT) or similar signal processing algorithm, the module 400 is operable to receive a synchronization signal for its given associated wheel 10 derived from the aforementioned ABS sensor encoder 118 and its associated circuits associated with the given wheel 10. Such a synchronization signal is beneficially provided from the aforementioned electronic control unit (ECU) 950 of the vehicle operating to provide a data communication hub for the vehicle. On account of the wheels 10 of the vehicle potentially revolving at mutually different rates, for example when the vehicle is turning or due to slight difference in outside diameters of the tires 30, each wheel 10 and its associated modules need to be individually synchronized in respect of their associated ABS sensor encoder 118.

Data processing performed by the computer processor 710 is beneficially capable of reducing a volume of data to be communicated via the wireless interface 730 to the electronic control unit (ECU). Such local data processing is of benefit in that it is primarily the wireless interface 730 which consumes a majority of power from the battery 700 when the module 400 is in operation. Data flow can be further reduced in the module 400 by the processor 710 transmitting periodically at a beginning of time frames actual data values of sensor signals followed by data representing changes in the data values during each time frame. Other approaches for obtaining data compression can also optionally be employed to reduce power consumption at the wireless interface 730. Beneficially, the module 400 is operable to transmit accelerometer signal data and pressure P data at a maximum sample rate in a range of 50 samples/second to 200 samples/second for each accelerometer axis and/or the pressure sensor 760 taking into consideration Nyquist sampling criteria. A lower rate of up to 1 sample per second for temperature T is optionally employed on account of the temperature T changing less rapidly in comparison to the acceleration A and pressure P.

The module 400 is also beneficially operable to permit software updates to be downloaded from the electronic control module (ECU) to the module 400, for example via its wireless interface 730, for upgrading or modifying its operation, for example in response to amended safety standards or policy adopted by an operator of the vehicle. Such software updates also enable new and improved data processing algorithms to be later employed, namely software upgrades.

As elucidated in the foregoing, the module 400 is programmed to have an identification code (II)) associated therewith which is useable by the aforesaid electronic control unit (ECU) for distinguishing the module 400 from other similar modules 400 on the vehicle, and also from similar types of modules 400 on other vehicles which sporadically pass in near proximity, for example on an adjacent lane during motorway driving. The electronic control unit (ECU) is operable to use the identification code (ID) to identify from which portion of the vehicle data conveyed via the module 400 is derived. Such identification will be described in more detail later.

Figure 15A:
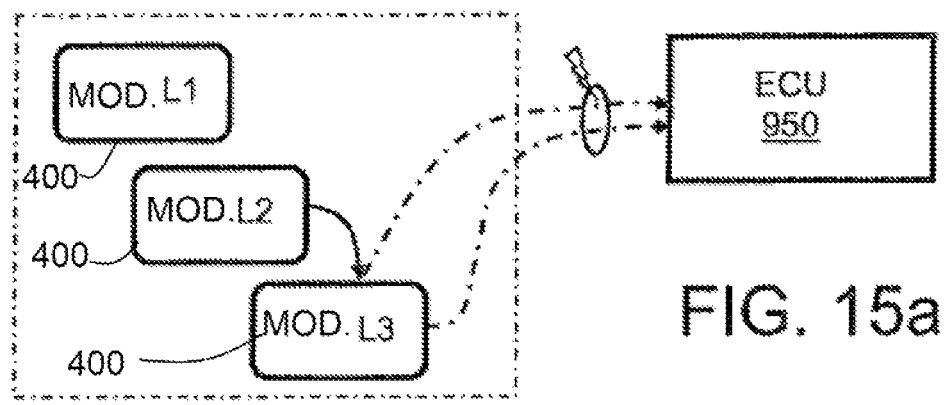
FIGS. 15a to 15e illustrate various alternative network communication topographies for monitoring modules mounted at various location on the wheel of FIGS. 1 and 6.

The computer processor 710 in combination with its wireless interface 730 is also operable to optionally provide a communication networking function. Beneficially, the computer processor 710 has a directly wired interface so that a first module 400 mounted at the location L1 on the wheel 10 is capable of being directly coupled via a wire or optical fibre communication link through the feed-through 310 as depicted in FIG. 7 to a second module 400 mounted at the position L2 on the rim 90 within the volume 120 as depicted in FIG. 15*a*. The processor 730 of the first module 400 located at the location L1 is thereby operable to:
(a) process signals generated by its array of sensors 750 and convey the processed signals as processed data to its wireless interface 730 of the first module 400 for communicating to the electronic control unit (ECU), as well as
(b) receiving processed signals output from the second module at the position L2 for conveying via the first module 400 and its wireless interface 730 to the electronic control unit (ECU).

Alternatively, data signals from the second module 400 at the location L2 can be:
(a) communicated via the wireless interface 730 of the second module at the location L2 to the wireless interface 730 of the first module at the location L1, and then
(b) the data signals can be relayed via the wireless interface 730 its associated computer processor 710 of the first module 400 to the electronic control unit (ECU).

Figure 15B:
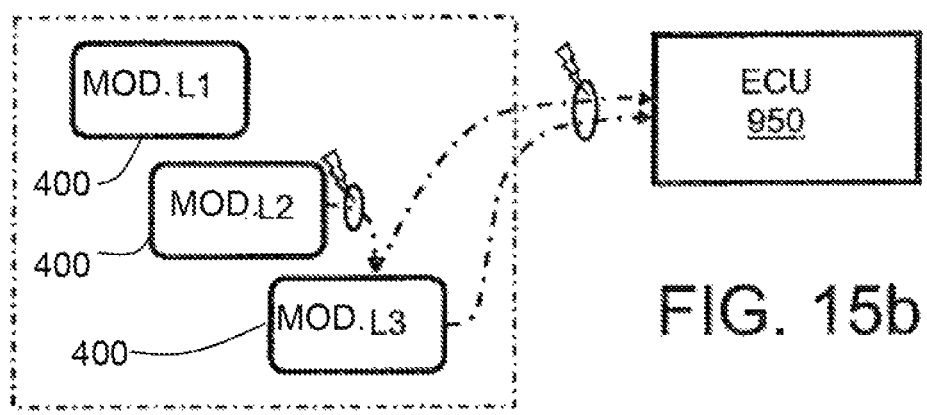

Such a communication link is also susceptible to being used in reverse for conveying aforementioned ABS synchronization signals via the first module 400 at the location L1 to the second module 400 at the location L2 as depicted in FIG. 15*b*.

Figure 15C:
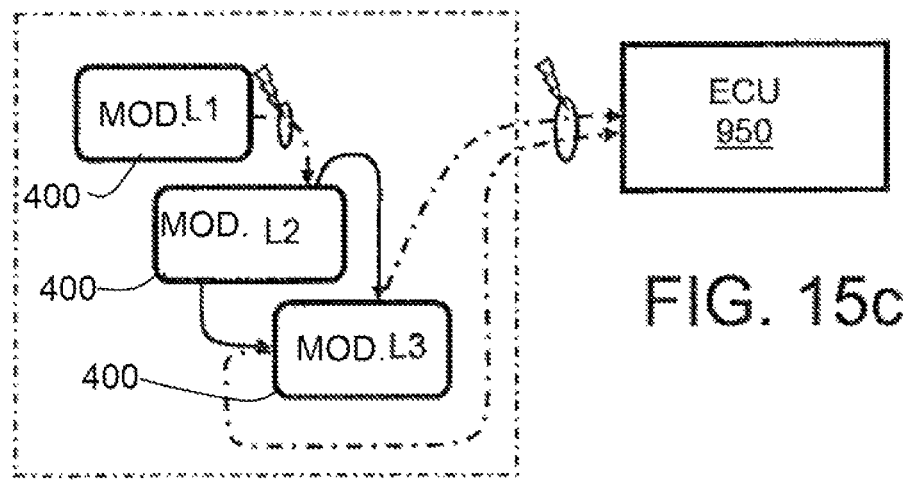

In a similar manner, the second module 400 at the location L2 is able to function as a network relay for a third module 400 mounted at the location 13. Beneficially, the second module 400 at the location L2 is coupled by wire or optical fibre via the feed-through 310 to the first module 400 at the location L1, and the third module 400 at the location L3 is coupled by wireless to the second module 400 at the location L2 as depicted in FIG. 15*c*. By such a configuration of FIG. 15*c*, problems with the mesh 210 and rim 90 functioning as a Faraday screen are avoided. Wireless communication between the third module 400 at the location L3 to the second module 400 at the location L2 is beneficial in view of a potentially large number of times the third module 400 at the location L3 moves in respect of the second module 400 at the location L2 in response to flexure of the wall 230 of the tire 30 as the wheel 10 rotates in operation; wires or similar direct connections linking the modules at the locations L2 and L3 would not only be prone to breakage due to work-hardening effects, but would also be impractical to attach once the tire 30 has been installed onto the hub 20 on account of the volume 120 then being user-inaccessible.

Figure 15D:
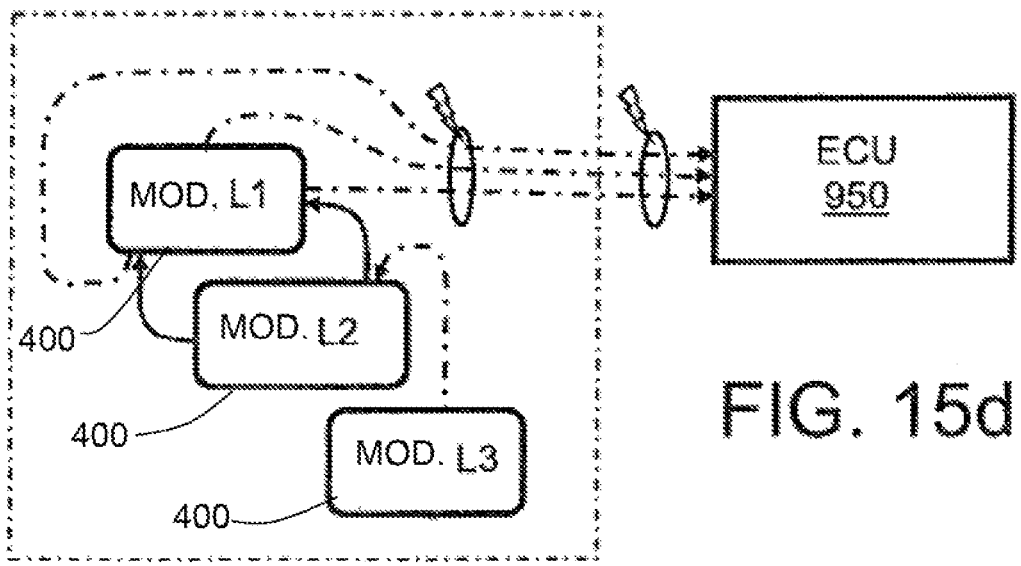

In an alternative configuration, the third module 400 at the location L3 is electrically coupled to the mesh 210 of the tire 30 which is used as a highly effective patch radio antenna for communicating by wireless to the electronic control unit (ECU). In such a configuration, the third module 400 at the location L3 is capable of functioning as a wireless relay node for communicating data from the second module 400 mounted at the location L2 on the rim 90. Such a configuration is illustrated in FIG. 15*d*.

Figure 15E:
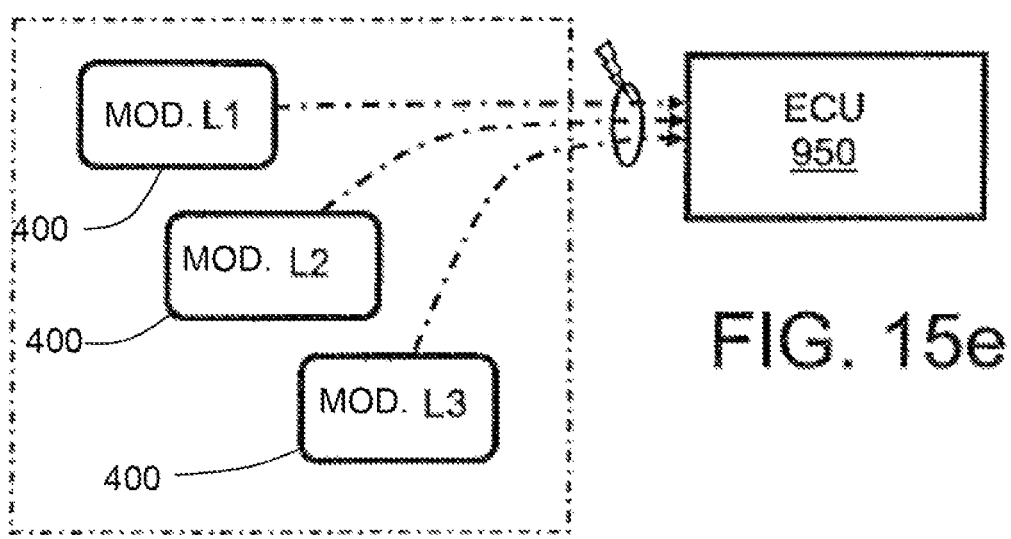

Other network configurations for the modules 400 at the locations L1, L2, L3 and LA are also feasible. For example, the modules 400 are optionally operable to all communicate directly by wireless via their wireless interfaces 730 directly with the electronic control unit (ECU) as depicted in FIG. 15*e*. Yet alternatively, the modules 400 are dynamically reconfigurable depending upon received wireless signal strength at the electronic control unit (ECU), for example between various network modes as elucidated in the foregoing with reference to FIGS. 15*a* to 15*e*. Such flexibility to reconfigure a communication network provided by the modules 400 is beneficial when wheels 10 are swapped around or changed on the vehicle. Such adaptability will be described in more detail later.

Beneficially, the first, second and third modules 400 mounted at the locations L1, L2 and L3 respectively each are provided with their uniquely-defining identification codes (ID) which the modules 400 are operable to employ when communicating with the electronic control unit (ECU) for distinguishing their data from that of other modules 400. Moreover, such identification codes (ID) are beneficial when the electronic control unit (ECU) sends synchronization signals derived from the ABS sensor encoders 118, for example in a situation where considerable data processing is performed locally at the modules 400 to reduce a quantity of data to be communicated via their wireless interfaces 730 to the electronic control unit (ECU) in operation.

In the foregoing, components such as the wheel 10 and its associated one or more modules 400 and its electronic control unit (ECU) mounted on the vehicle have been described. These components form a part of a wheel- and tyre-monitoring system which will now be elucidated in greater detail with reference to FIG. 16.

Figure 16:
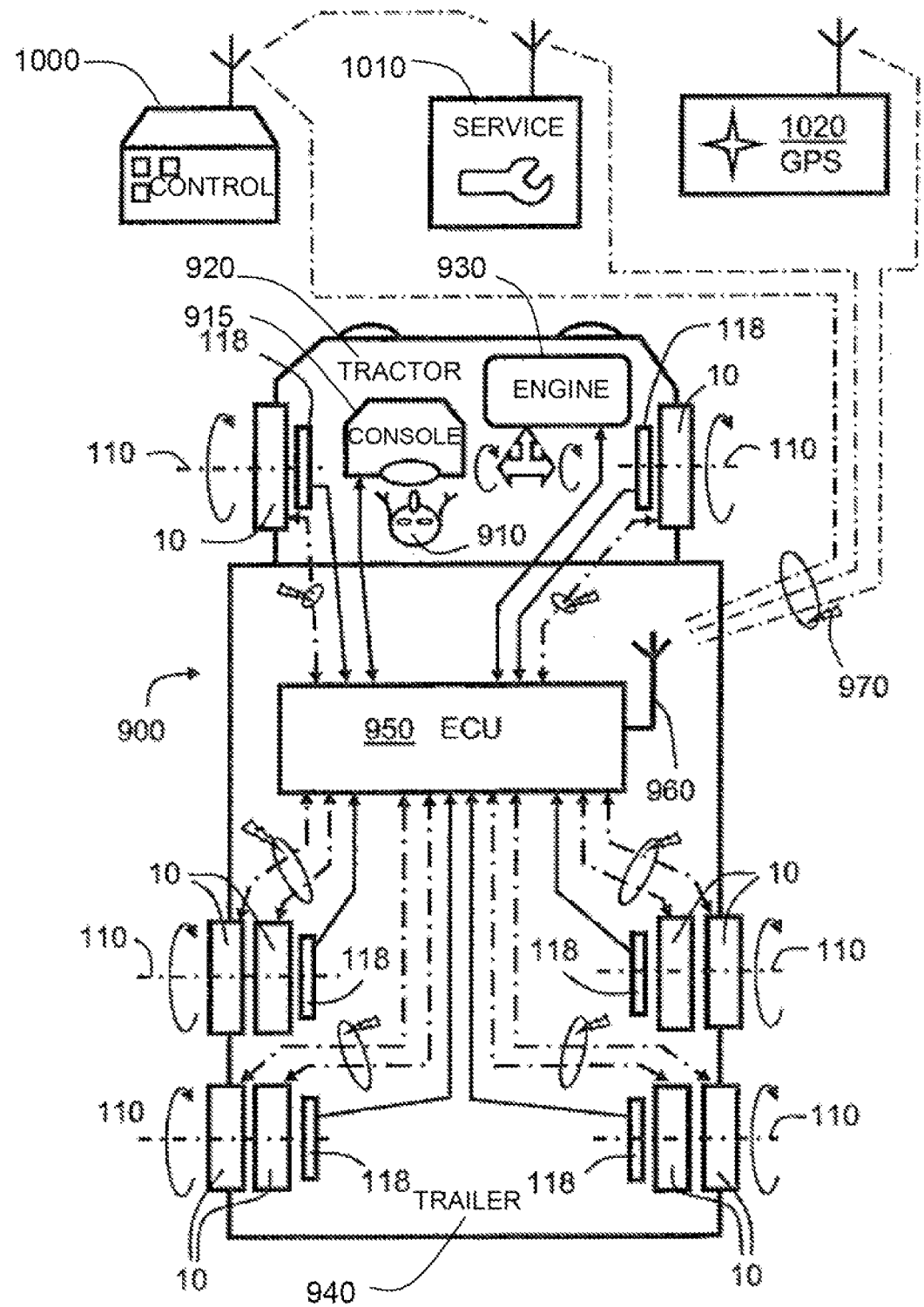
FIG. 16 is a schematic illustration of a wheel monitoring system pursuant to the present invention for a heavy commercial vehicle in conjunction with a remote control facility and service facility.

In FIG. 16, there is shown in plan view the aforementioned vehicle indicated generally by 900. The vehicle 900 is driven in operation by the aforesaid driver denoted by 910 in FIG. 16. Moreover, the vehicle 900 comprises a front tractor unit 920 including a combustion engine 930 operable to provide motive force to a pair of steerable front wheels 10 beneficially implemented in a manner substantially as depicted in FIG. 4. The combustion engine 930 is at least one of: a contemporary cylinder combustion engine, a combustion engine with turbocharger, an electric series or parallel hybrid engine, a gas turbine engine, a fuel cell system providing electrical power to associated electric motor traction. The vehicle 900 also comprises a trailer unit 940 having two sets of double rear wheels 10 as shown; the double rear wheels 10 are beneficially implemented in a manner as depicted in FIG. 5 and are also optionally also steerable in a manner similar to the front wheels 10 of the front tractor unit 920. Other configurations of wheels 10 for the vehicle 900 are possible and FIG. 16 is merely one example for describing the present invention. The vehicle 900 is further provided with the aforementioned electronic control unit (ECU) denoted by 950; the electronic control unit (ECU) 950 includes a computer processor together with data memory and one or more wireless interfaces and electrical interfaces, the computer processor being operable to execute one or more software products including executable software code. The electronic control unit (ECU) 950 is coupled in communication with a console 915 operated by the driver 910. Optionally, the electronic control unit (ECU) 950 is also coupled in communication with the combustion engine 930 for performing engine management and monitoring functions, for example deliberately limiting a speed, or recommending to the driver a suitable speed, at which the driver 910 is able to drive the vehicle 900 in an event of the electronic control unit (ECU) 950 detecting a problem, or potential problem, with one or more wheels 10 of the vehicle 900. Moreover, the electronic control unit (ECU) 950 is also wirelessly coupled to one or more modules 400 mounted on one or more of the wheels 10 of the vehicle 900 as elucidated in the foregoing.

The electronic control unit (ECU) 950 includes an antenna 960 for transmitting and receiving wireless signals as denoted by 970 for enabling the vehicle 900 to communicate with other facilities, for example a control centre 1000 of an enterprise organising logistics for a fleet of such vehicles 900, or to a service facility 1010 whereat wheels 10 and their tires 30 of the vehicle 900 can be serviced or replaced as depicted in FIG. 16. Beneficially, the electronic control unit (ECU) 950 is operable to monitor operation of the wheels 10 of the vehicle 900 and automatically inform the control centre 1000 of a need to inform the driver 910 to drive the vehicle 900 into the service facility 1010 for servicing its wheels 10 and associated tires 30, for example as part of a delivery schedule planned for the vehicle 900, thereby causing less disruption to a service provided by the enterprise to its customers. A visit to the service facility 1010 is optionally invoked in response to weather conditions or time, for example in connection with exchanging summer tires 30 to winter tires 30 in Northern Europe and North America.

Optionally, the electronic control unit (ECU) 950 is also wirelessly coupled to a global positioning system (GPS) 1020 for determining in operation a spatial position of the vehicle 900 upon the surface of the Earth. The GPS system 1020 is, for example, that managed by US Authorities or an equivalent European Galileo positioning system. Yet alternatively, or additionally, the GPS system 1020 is based on a mobile telephone, namely cell net, system known as GPRS or similar. In operation, the electronic control unit (ECU) 950 is operable to determine whereat the vehicle 900 is located and convey this positional information to the control centre 1000 so that the control centre 1000 is aware of the position of the vehicle 900. Moreover, as elucidated in the foregoing, in an event that electronic control unit (ECU) 950 detects by way of one or more of the modules 400 that one or more of its wheels 10 are defective or needing maintenance, or are potentially likely to become defective or needing maintenance, the control centre 1000 can direct the vehicle 900 to a suitable geographically convenient service centre 1010. Optionally, the control centre 1000 is also operable to arrange, based upon knowledge of the position of the vehicle 900, for the tractor 920 to be decoupled from its trailer 940 at a suitable geographical location so that an alternative tractor can be rapidly coupled to the trailer 940 to haul the trailer 940 and its contents further promptly to its destination, for example to a customer; the tractor 920 can then be serviced without disrupting time-critical deliveries in the trailer 940 to the customer. Moreover, the service centre 1010 can also be warned in advance, either directly from the vehicle 900 or indirectly via the control centre 1010 or both, regarding arrival of the vehicle 900 together with an indication of a likely problem with one or more wheels 10 of the vehicle 900. Such notification of problems regarding the vehicle 900 to the control centre 1000 and optionally to the service centre 1010 is susceptible to occurring automatically without the driver 910 needing to interpret messages and actively inform one or more of the control centre 1000, the service centre 1010 or the customer. An improvement of service to the customer is thereby susceptible to being achieved.

In order that the vehicle 900 should not be immobilized in an event of its electronic control unit 950 detecting a problem with one or more of the wheels 10 of the vehicle 900, or malfunction of one or more of its modules 400, the electronic control unit (ECU) 950 is operable to generate various warning messages. In an event of malfunction of one or more of the modules 400, the electronic control unit (ECU) 950 is operable to send a warning to at least one of the control centre 1000 and the driver 910 of such malfunction, but continue to monitor other wheels 10 whose modules 400 are continuing to function correctly. Such graceful decline in monitoring functionality of the modules 400 mounted on one or more of the wheels 10 is susceptible to improving operational robustness of the vehicle 900, namely failure of one or more of the modules 400 does not immobilize the vehicle 900. It is a decision then of the driver 900 and/or the control centre 1000 whether or not to continue driving the vehicle 900 in view of one or more of its module 400 becoming non-operational. A potential cause of one or more of the modules 400 failing is exhaustion of batteries 700 therein, or replacement of a tire 30 for example.

3. Auto-Alignment of Modules

As will be appreciated from the foregoing, the module 400 is employed when implementing the present invention in various configurations. When the module 400 includes the accelerometer 770 as depicted in FIG. 14, the module 400 can be regarded as being a form of inertial navigation unit (INU). Moreover, it is elucidated in the foregoing that processing signals corresponding to radial, tangential and transverse accelerations, namely $A_y$, $A_x$ and $A_z$ as depicted in FIG. 9, and resolving them to yield the vertical acceleration $A_v$ as depicted in FIGS. 11 and 13 is found to be highly beneficial for deriving an indication of imbalance of the wheel 10, a type of imbalance of the wheel 10, whether or not the wheel 10 is skewed out of plane, whether or not the wheel 10 is loose on its fasteners, as well as monitoring flexural characteristics of the walls 230 of the tire 30. However, in a manner similar to inertial navigation units (INU) for steering vehicles such as rockets, helicopters, aircraft and so forth, it is conventionally found important that the inertial navigation units (INU) are mounted in accurate angular alignment with various reference axes of these vehicles. However, achieving such accurate angular alignment requires accuracy and precision which is potentially time consuming and costly to achieve. In a similar manner, pursuant to the present invention, it is highly desirable that the one or more modules 400 be mountable to the wheel 10, for example at one or more of the locations L1 to L4, without a high degree of mounting precision and accuracy being necessary. By implementing the present invention such that the module 400 can be mounted in manner which does require its orientation to be precisely ensured, time and costs associated with furnishing the wheel with one or more of the modules 400 can be reduced. Such implementation of the present invention will now be elucidated with reference to example embodiments of the invention.

For a given wheel 10 correctly mounted to its axle 110, it is beneficial to refer to:
(a) a lateral direction as being the z-axis parallel to the axis B-B;
(b) a radial direction from the axis B-B, and thus from the axle 110, as being the y-axis; and
(c) a tangential axis at a given position on the wheel 10 as being the x-axis, as illustrated in FIG. 17.

The z-axis and the y-axis are pertinent at the locations L1 to L4. The x-axis is dependent upon a radius r at which the point is from the axis B-B. FIG. 17 corresponds to FIG. 9 for the inclination angle φ being substantially zero. As elucidated earlier, the acceleration $A_z$ is especially useful, as depicted in FIG. 10, for monitoring flexural characteristics of the tire 30 as well as detecting whether or not the wheel 10 is at a skewed angle relative to its axle 110. Moreover, the vertical acceleration $A_v$ resolved from $A_x$ and $A_y$ acceleration components measured at a given module 400 is beneficial for monitoring imbalance in the wheel 10 and also a type of imbalance involved. However, as shown in FIG. 17, the module 400 is potentially mounted in an angularly misaligned position on the wheel 10 such that its local orthogonal axes denoted by x', y', z' do not align with true axes x, y, z required for generating highly useful $A_x$, $A_y$, $A_z$ acceleration signals.

Accelerations $A_x'$, $A_y'$, $A_z'$ correspond to measurements of accelerations along the local orthogonal axes x', y', z' respectively. It is feasible to resolve the accelerations $A_x'$, $A_y'$, $A_z'$ in respect of the true axes x, y, z as provided by a matrix mapping as defined by Equation 10 (Eq. 10):

$$\begin{pmatrix} 1 & 0 & 0 \\ 0 & \cos\beta & \sin\beta \\ 0 & -\sin\beta & \cos\beta \end{pmatrix} \begin{pmatrix} \cos\alpha & \sin\alpha & 0 \\ -\sin\alpha & \cos\alpha & 0 \\ 0 & 0 & 1 \end{pmatrix} \begin{pmatrix} A_x' \\ A_y' \\ A_z' \end{pmatrix} = \begin{pmatrix} A_x \\ A_y \\ A_z \end{pmatrix} \qquad \text{Eq. 10}$$

wherein angles α and β are resolving angles mapping the axes x', y', z' onto the true axes x, y, z.

A special condition arises when the wheel 10 rotates at a constant angular velocity ω, for example as determinable by the electronic control unit (ECU) 950 from signal generated from ABS sensor encoders 118, the vehicle 900 is driving straight ahead and not turning, for example as determined from an angular sensor coupled to the steering wheel at the console 915, and a plane of the wheel 10 is orthogonal to the axis B-B and hence to the axle 110 in that:
(a) the lateral acceleration $A_z$ is substantially zero as define by Equation 11 (Eq. 11);
(b) the tangential acceleration $A_x$ is substantially zero when integrated over a complete 2□ change in the rotation angle Θ of the wheel 10.

$$\int_{\theta_1}^{\theta_2} A_z = 0 \qquad \text{Eq. 11}$$

wherein $\Theta_1$ and $\Theta_2$ are lower and upper integration limits corresponding to first and second angular rotation angles Θ of the wheel 10.

$$\int_{y}^{y+2n\pi} A_x = 0 \qquad \text{Eq. 12}$$

wherein γ is an offset angle and n is an integer such that n=1, 2, 3, . . . .

Suitable values for the angles α and β are susceptible to being computed in an iterative manner so that Equations 11 and 12 can be substantially achieved, or at least a minimized condition in respect of the angles α and β is susceptible to being achieved. For example, spurious road surface noise present in the accelerations $A_x'$, $A_y'$, $A_z'$ potentially requires a minimum condition to be searched for as a best approximation for satisfying Equations 11 and 12.

Optimal values for the angles α and β can either be found from an explicit solution for Equations 10, 11 and 12, or iteratively by recomputing for various combinations of the angles α and β for a sample of signals representative of the accelerations $A_x'$, $A_y'$, $A_z'$ until a nearest approximation to Equations 11 and 12 is achieved.

Computation of the angles α and β is beneficially performed at the electronic control unit (ECU) 950. Alternatively, distributed computing performed at the module 400 can also be employed for computing the angles α and β. Once the angles α and β have been computed for a minimized condition or a zero condition as given in Equations 11 and 12, application of these angles α and β pursuant to Equation 10 to obtain the accelerations $A_x$, $A_y$, $A_z$ for monitoring operation of the wheel 10, for example as depicted in FIGS. 11 and 13, is susceptible to being implemented at the electronic control unit (ECU) 950 or at the module 400, or distributed between both the electronic control unit (ECU) 950 and the computer processor 710 of the module 400 to spread computational load.

Equations 10 to 12 are an example of auto-resolving accelerations sensed by the accelerometer 770 of the module 400 to generate corresponding acceleration signals suitable for processing as depicted in FIGS. 11 and 13 with associated description in the foregoing. Although auto-resolving for a three-axis accelerometer 770 is described, such approximate auto-resolving can be also be employed when the accelerometer 770 is a two-axis accelerometer for example in simplified form. Auto-resolving is also susceptible to being referred to as auto-alignment.

Auto-resolving, for example as described in Equations 10 to 12, is of benefit in that the one or more modules 400 mounted one or more of the locations L1 to L4 do not need to be mounted onto the wheel 10 pursuant to highly precise angular alignment, thereby simplifying mounting of the one or more modules 400 to the wheel 10 and potentially reducing assembly and mounting costs.

When auto-resolving pursuant to Equations 10 to 12 is employed in the apparatus 600, a corresponding apparatus as indicated generally by 2200 in FIG. 22 wherein an auto-resolver is denoted by 2210. The apparatus 2200 includes at least one module 400 whose accelerometer 770 is operable to generate the acceleration signals $A_x'$, $A_y'$, $A_z'$ which are firstly auto-resolved in the auto-resolver 2210 to generate corresponding resolved acceleration data for the accelerations $A_x$, $A_y$, $A_z$. The resolved accelerations $A_x$, $A_y$, $A_z$ are then further resolved in the resolver 620 in respect of the rotation angle Θ of the wheel 10 as sensed by the ABS sensor encoder 118 to generate corresponding vertical acceleration $A_y$ signal data and also acceleration $A_z$ signal data. The acceleration $A_y$, $A_z$ signal data are then subject to harmonic analysis in the harmonic analyzer 630 to generate corresponding series of harmonic coefficients $Q_y(m)$ and $Q_z(m)$ respectively in relation the angular frequency $\omega$ of rotation of the wheel 10. The harmonic coefficients $Q_y(nm)$ and $Q_z(m)$ are then optionally subject to harmonic scaling in the scaler 640 to generate corresponding scaled harmonic coefficients $y_y(m) \cdot Q_y(m)$ and $y_z(m) \cdot Q_z(m)$ which are then subject to analysis in terms of absolute magnitude and relative magnitude to determine whether or not:

(a) the wheel 10 is imbalanced;
(b) a type of imbalance present in the wheel 10;
(c) the wheel 10 is skewed in relation to the axle 110;
(d) the wheel 10 is loose and wobbling about on its fasteners;
(e) the tire 30 has defects in its flexural characteristics, for example its mesh 210 has become damaged;
(f) the tire 30 is insufficiently inflated;
(g) the tire 30 is over-inflated;
(h) the tire 30 is oval or has a higher-order lobed distortion;
(i) there is a mass imbalance in the wheel 10;
(j) wheel bearings associated with the axle 110 are vibrating or rattling in an unexpected manner indicative of a fault, or potentially developing fault, to mention a few alternative types of analysis which are executable using the apparatus 2200.

When harmonic scaling in the scaler 640 is optionally not required, its scaling values are beneficially set to a uniform value, for example $y_y(m)=1$, $y_z(m)=1$ unity value, or the scaler 640 simply bypassed. Moreover, for the apparatus 2200, one or more modules 400 can be optionally mounted at one or more of the locations L1, L2 and L3. The apparatus 2200 is susceptible to being implemented in hardware, in software executable on computing hardware, or a combination of such hardware and software. Moreover, the apparatus 2200 is susceptible to being implemented substantially in the electronic control unit (ECU) 950, on the module 400, or on both the module 400 and electronic control unit (ECU) 950 in combination. The software is optionally supplied as one or more software products on one or more data carriers. Moreover, the software is optionally dynamically reconfigurable depending on potentially changing configurations of one or more modules 400 included on the wheel 10.

The apparatus 2200 illustrated in FIG. 18 is susceptible to being modified in a manner akin to the apparatus 690 illustrated in FIG. 13, namely concurrently or alternately being operable to harmonically analyze a sampled signal representative of the pressure P in the volume 120 of the tire 30.

The auto-resolver 2210 requires calibrating in order to determine its correction angles ☐ and ☐ as elucidated in the foregoing. Such calibration is beneficially implemented as part of the aforesaid methods of "calibrating" the modules 400, namely enabling the electronic control unit (ECU) 950 to identify which modules 400 with which it is required to communicate on the vehicle 900, wherein the modules 400 are mounted at various locations on wheels 10 of the vehicle 900, with potentially mutually different operating characteristics of the modules 400; as elucidated earlier, a situation potentially arises in operation where certain wheels 10 of the vehicle 900 are provided with a more comprehensive set of modules 400 in comparison to other wheels of the vehicle 900, in a potentially temporally dynamically changing manner. Auto-resolving in the auto-resolver 2210 has an effect with regard to the module 400 mounted at the location L3 to effectively set the offset angle $\phi_0$ in Equation 6 (Eq. 6) to substantially a null value, namely $\phi_0=0$, and thereby potentially simplifies associated signal processing in operation for monitoring flexural characteristics of the tire 30.

Although use of the present invention in relation to heavy commercial vehicles is described in the foregoing, it will be appreciated that the invention is also applicable to other types of vehicle, for example on wheels of aircraft, on wheels of automobiles, wheels of motorcycles and bicycles, on heavy construction equipment, on the wings of electricity wind turbines to identify potential structural problems, and so forth.

Expressions such as "has", "is", "include", "comprise", "consist of", "incorporates" are to be construed to include additional components or items which are not specifically defined; namely, such terms are to be construed in a non-exclusive manner. Moreover, reference to the singular is also to be construed to also include the plural. Furthermore, numerals and other symbols included within parentheses in the accompanying claims are not to be construed to influence interpreted claim scope but merely assist in understanding the present invention when studying the claims.

4. Further Examples of Use of the Module

Modifications to embodiments of the invention described in the foregoing are susceptible to being implemented without departing from the scope of the invention as defined by the appended claims.

Although the computer processor 710 is described in the foregoing as being a computing device operable to execute software, it will be appreciated that the computer 710 is susceptible to being substituted by a dedicated logic device, for example an allocation specific integrated circuit (ASIC), and the present invention is to be construed to include the use of such ASIC devices.

For example, use of the ABS sensor encoder 118 for sensing rotation of the wheels 10 has been described in the foregoing. However, additionally or alternatively, a measure of the angular orientation C of the wheel 10 can also be computed, as elucidated in the foregoing, on a basis of the gravitational force g acting upon the accelerometer 770 of the module 400. The gravitation force g is manifested in operation in the acceleration components $A_x$, $A_y$ and is superimposed on any acceleration experienced at the wheel 10 due to general acceleration or deceleration of the vehicle 900. On account of a typical time scale in which cyclical fluctuations of the gravitational force g as observed in the acceleration components $A_x$, $A_y$ being generally more rapid than effects due to such general acceleration or deceleration of the vehicle 900, it is feasible to filter out or compensate for such components in the acceleration components $A_x$, $A_y$, as a weight of the vehicle 900 and a motive power output from the engine or motor 930 of the vehicle 900 can be estimated or measured. When the angular orientation $\Theta$ of the wheel 10 is derived from the acceleration components $A_x$, $A_y$, in addition to or as an alternative to the ABS encoder sensor 118, such derivation does not preclude the use of aforementioned auto-alignment of the axes x', y', z' of the module 400 to the true x, y, z axes of the wheel 10 representative of orthogonal tangential and lateral axes respectively, see FIG. 9. Such derivation of the angular orientation $\Theta$ enables the present invention to be, for example, applied to vehicles which are not equipped with ABS braking or partially equipped with ABS braking on only certain of their wheels. Moreover, such derivation enables the present invention to be retrofitted in certain situations to older vehicles which are not provided with ABS braking.

Flexure of the side-wall 230 of the tire 30 is also susceptible to being sensed by a first module 400 mounted at the location L3 moving in respect of a second module 400 mounted at the location L2 in close spatial proximity to the first module 400. In operation, flexure of the side-wall 230 causes a relative spatial distance between the first and second modules 400 to vary correspondingly.

In a first configuration, the first module 400 is provided with a source of radiation, and the second module 400 is operable to monitor a magnitude of a portion of the radiation received thereat and convey a corresponding signal by wireless to the electronic control unit (ECU) 950. The signal is representative of a change of spatial separation between the first and second modules 400 as a function of their wheel 10 rotating.

In a second configuration, the second module 400 is provided with a source of radiation, and the first module 400 is operable to monitor a magnitude of a portion of the radiation received thereat and convey a corresponding signal by wireless, for example using the mesh 210 of the tire 30 as a wireless patch antenna, to the electronic control unit (ECU) 950. The signal is representative of a change of spatial separation between the first and second modules 400 as a function of their wheel 10 rotating.

The radiation can be at least one of: a substantially constant magnetic field generated by a permanent magnet, an alternating magnetic field, ultrasonic radiation, wireless radiation, pulsed optical radiation, capacitive electrostatically-coupled radiation to mention a few examples. Ultrasonic radiation is beneficially generated and received using piezo-electric transducers.

Advantageous features of the system as defined above are as follows:

Optionally, the module is operable to detect depressurization events experienced by the wheel and an exchange of the tire include corresponding information in the record.

Optionally, the module is mountable at one or more locations (L1, L2, L3, L4) on the wheel, the one or more locations including:
(a) on a hub of the wheel substantially at an axis (B-B) of rotation of the wheel;
(b) on a hub of the wheel at a radial distance from the axis of rotation (B-B) of the wheel;
(c) on a hub of the wheel in fluid communication with a filling valve of a tire of the wheel for sensing a pressure (P) within the tyre;
(d) within a tire of the wheel for sensing a pressure (P) within the tire, the module being mounted to a peripheral surface of a hub of the wheel;
(e) within a tire of the wheel for sensing a pressure (P) within the tire, the module being mounted to an inside side-wall surface of the tire for measuring flexural characteristics of the side-wall; and
(f) on an inside surface of a peripheral rim of the wheel for measuring acceleration thereat.

Optionally, the module includes a temperature sensor for sensing a temperature ($T_{mod}$) thereat, the temperature sensor being operable to generate a temperature signal representative of the temperature ($T_{mod}$) for receipt at the data processor for at least one of recording in the data memory and communicating via the wireless interface externally to the module. Monitoring the temperature ($T_{mod}$) enables a pressure (P) measured within a tire or inflated cavity of the at least one wheel to be at least partially corrected for temperature effects when executing computations regarding wheel operation. Moreover, in an event that an excessive temperature rise is detected, a warning can be optionally issued by the apparatus.

Optionally, the module includes at least one of:
(a) a strain gauge sensor for measuring flexure of the tire of the wheel, the strain gauge sensor being operable to generate a signal indicative of the flexure for receipt at the data processor for at least one of recording in the data memory and communicating via the wireless interface externally to the module;
(b) an accelerometer for measuring acceleration ($A_x$, $A_y$, $A_z$) in at least one axis at a mounting location (L1, L2, L3, L4) of the module on the wheel, the accelerometer being operable to generate a signal indicative of the acceleration ($A_x$, $A_y$, $A_z$) for receipt at the data processor for at least one of recording in the data memory and communicating via the wireless interface externally to the module; and
(c) a magnetic sensor for measuring a magnetic field applied to the module, the module being operable to generate a signal indicative of the applied magnetic field to the data processor for at least one of recording in the data memory and communicating via the wireless interface externally to the module.

Such physical parameters have been found to be beneficial to monitor when assessing operation of the at least one wheel. It will be appreciated that the one or more modules can be equipped with a subset of the options (a) to (c); for example, a module can be provided with only a pressure sensor, or a combination of a pressure sensor and an accelerometer. Moreover, certain modules are optionally provided with a single-axis accelerometer, whereas other such modules are provided with triple-axis accelerometers. Other combinations of sensors included within the modules are possible pursuant to the present invention.

More optionally, in the module, the accelerometer is a multi-axis accelerometer operable to measure components of acceleration ($A_x$, $A_y$, $A_z$) in at least one of radial, tangential and transverse axes in respect of rotations of the wheel. Yet more optionally, the accelerometer is a silicon micromachined device. For rendering the module compact and less expensive to manufacture, the accelerometer is beneficially a silicon micromachined device. Such silicon devices are extremely robust, cost effective and are capable of providing precise and accurate measurement of acceleration.

Optionally, in the module, the wireless interface is operable to communicate between the module and a processing arrangement (ECU) of a vehicle, the module forming a wireless network with other similar modules, wherein certain of the one or more modules are operable to function as one or more relay nodes for conveying signal exchange between a processing arrangement (ECU) and other of the one or more modules. By establishing such a communication network, modules mounted in wireless shadows where they are occluded by conductive elements are operable, via the network, to provide their measured signals to the processing arrangement.

Optionally, in the module, the wireless interface is operable to communicate between the module and a processing arrangement (ECU), the module forming a wireless network with other similar modules which is dynamically reconfigurable for conveying signals between the one or more modules and the processing arrangement (ECU). An ability exhibited by the network to dynamically reconfigure itself is of advantage in that an apparatus including the module is able to continue operating with reduced monitoring functionality in an event of one or more of the modules ceasing to provide their respective signals to the processing arrangement (ECU). Such a reconfigurable property of the network not only renders the apparatus more robust, but also allows the apparatus to adapt when additional modules are added to the apparatus. Such an operating characteristic also circumvents the apparatus becoming non-function merely on account of one of its modules developing a problem in operation, for example its battery becomes fully discharged in operation.

Optionally, the module is provided with a corresponding identification code (ID) for communicating to a processing arrangement (ECU) external to the module, so that the processing arrangement (ECU) is able to recognize the module when corresponding signal data has been sent therefrom and attribute the signal data to the module. Use of such identification codes (ID) enables one or more wheels which have developed problems, or have been found to have potential problems, to be clearly identified and a corresponding unambiguous informative warning sent to the driver of the vehicle and/or to a service facility responsible for addressing such problems or potential problems.

Optionally, the module includes one or more sources of electrical power for energizing the module, the one or more sources of electrical power including at least one rechargeable battery and one or more generators for recharging the one or more sources, the one or more generators deriving energy from rotations of the at least one wheel. On account of the one or more modules rotating with their respective wheels, providing electrical slip rings or inductive electrical couplings represents a considerable practical complication, especially in view of regions around wheels of contemporary wheels already being heavily populated with other components such as ABS rotation sensors, disc brakes, suspension components and so forth. However, after prolonged use, local sources of power can become exhausted unless recharged or replaced; inclusion of the one or more generators are capable of addressing such problems.

More optionally, in the module, the one or more generators are at least one of:
(a) an electromagnetic generator based upon movement of a mass operable to move in response to rotation of the wheel; and
(b) a piezo-electric generator based upon force generated by a mass operable to apply a varying force to a piezo-electric device in response to rotations of the wheel.

Certain conductive components in and around the at least one wheel are susceptible to creating radio shadows and causing Faraday screening. In order to address problems arising from such radio shadows and Faraday screening, optionally in the module, the wireless interface is coupled to an electrically conducting mesh of the tire of the wheel, the conducting mesh being operable to function as a wireless patch antenna for the module for supporting wireless communication between the module and a processing arrangement (ECU) external to the module.

Optionally, in the module, the data processor is coupled to the data memory, and the module via its pressure sensor is operable to record the pressure (P) within the tire of the wheel in relation to time (t) as determined by a clock arrangement (CLK) included within the module, and the processor is operable to monitor changes in the pressure (P) with time (t) to identify one or more of:
(a) a gradual leak of air or gas from the tire indicative of a need to recharge the tire with air or gas; and
(b) any abrupt depressurization of the tire indicative of a puncturing event or a rapid deflation event having occurred, or the tire having been exchanged.

More optionally, the module is operable to communicate a message therefrom that sensed data pertaining to the tire of the wheel being potentially unreliable on account of the abrupt depressurization.

More optionally, the module is operable to monitor the pressure (P), irrespective of whether or not the module is in its hibernating energy-saving state. Such operation renders tampering executed on the vehicle when in a parked state detectable.

In their hibernating state, the one or more modules are beneficially operable to briefly switch momentarily to their active state to identify whether the processing arrangement is issuing a active state command and/or physical parameters such as pressure and/or acceleration have began to fluctuate in a manner indicative that the at least one wheel is in motion.

Optionally, the module is operable to switch between an active state and an energy-saving hibernating state. The hibernating state is of benefit in that it prolongs a period of use of the batteries associated with the one or more modules and renders frequent recharging of the batteries less necessary thereby prolonging their operating lifetime. Rechargeable batteries are only capable of withstanding a finite number of discharge cycles before their electrical storage capacity deteriorates.

More optionally, the module is operable to switch between the active state and the hibernating state in response to one or more instructions communicated by wireless to the module. By using such wireless instructions, it is feasible to force all the one or more modules into their hibernating state promptly after, for example, parking the vehicle and switching-off its combustion engine; the hibernating state conserves energy in batteries of the one or more modules when the vehicle is not in use. Likewise, a single wireless instruction is capable of waking up the one or more modules from their hibernating state when the vehicle is started again.

More optionally, the module is operable to switch from the active state to the energy-saving hibernating state in response to a period of time (t) in which the module detect one or more of:
(a) a cessation of changes in pressure (P) of the tire of the wheel during a predetermined period of time (t); and
(b) a cessation of changes in acceleration ($A_x$, $A_y$, $A_z$) sensed on the wheel during a predetermined period of time (t).

More optionally the module is operable to switch from the energy-saving hibernating state to the active state in response to the module detecting one or more of:
(a) a resumption of changes in pressure (P) of the tire of the wheel associated with rotations of the wheel; and
(b) a resumption of changes in acceleration ($A_x$, $A_y$, $A_z$) sensed on the wheel.

Optionally, the one or more modules are themselves capable of autonomously switching to their hibernating state to conserve their batteries. Similarly, the one or modules are beneficially capable of automatically and autonomously returning to their active state without the processing arrangement needing to send any explicit instructions.

Optionally, the module is operable to also respond with data indicative of expected characteristics of the wheel to which the module is mounted in operation.

Optionally, the module is operable to monitor a tampering event applied to the wheel.

According to a second aspect, there is provided a method of monitoring a pressure (P) within a tire using a module. According to a second aspect, there is provided a method of monitoring at least a pressure (P) within a tire of a wheel using a module operatively mounted to at least one of the tire and a hub of the wheel, the method being characterized in that includes steps of:
(a) measuring the pressure (P) using a pressure sensor of the module for generating a corresponding pressure signal;
(b) receiving the pressure signal at a data processor of the module, the data processor being coupled in communication with an associated data memory;
(c) generating a record the pressure (P) as a function of time (t) in the data memory for monitoring the wheel and its tyre; and
(d) communicating information derived from the record via a wireless interface of the module for enable a condition of the wheel to be monitored externally to the module.

Optionally, the method includes a further step of detecting depressurization events experienced by the wheel and an exchange of the tire and including corresponding information in the record.

More optionally, the method includes a step of mounting the module at one or more locations (L1, L2, L3, L4) on the wheel, the one or more locations including:
(a) on a hub of the wheel substantially at an axis (B-B) of rotation of the wheel;
(b) on a hub of the wheel at a radial distance from the axis of rotation (B-B) of the wheel;
(c) on a hub of the wheel in fluid communication with a filling valve of a tire of the wheel for sensing a pressure (P) within the tyre;
(d) within a tire of the wheel for sensing a pressure (P) within the tire, the module being mounted to a peripheral surface of a hub of the wheel;
(e) within a tire of the wheel for sensing a pressure (P) within the tire, the module being mounted to an inside side-wall surface of the tire for measuring flexural characteristics of the side-wall; and
(f) on an inside surface of a peripheral rim of the wheel for measuring acceleration thereat.

Mounting the one or more modules at these different locations is of benefit in that certain types of defect in the at least one wheel are more reliably sensed when the one or more modules are mounted at specific favourable locations. For example, wheel imbalance is better sensed with a module mounted on the wheel near its hub, whereas flexural characteristics of the tire or inflatable cavity are better sensed with a module attached to a side wall of the tire or flexible inflatable cavity. More optionally, a module is mounted to an inside rim of a tire, adjacent to its treads.

More optionally, when implementing the method, the module includes a temperature sensor for sensing a temperature ($T_{mod}$) thereat, the temperature sensor being operable to generate a temperature signal representative of the temperature ($T_{mod}$) for receipt at the data processor for at least one of recording in the data memory and communicating via the wireless interface externally to the module.

Optionally, when implementing the method, the module includes at least one of:
(a) a strain gauge sensor for measuring flexure of the tire of the wheel, the strain gauge sensor being operable to generate a signal indicative of the flexure for receipt at the data processor for at least one of recording in the data memory and communicating via the wireless interface externally to the module;
(b) an accelerometer for measuring acceleration ($A_x$, $A_y$, $A_z$) in at least one axis at a mounting location (L1, L2, L3, L4) of the module on the wheel, the accelerometer being operable to generate a signal indicative of the acceleration ($A_x$, $A_y$, $A_z$) for receipt at the data processor for at least one of recording in the data memory and communicating via the wireless interface externally to the module; and
(c) a magnetic sensor for measuring a magnetic field applied to the module, the module being operable to generate a signal indicative of the applied magnetic field to the data processor for at least one of recording in the data memory and communicating via the wireless interface externally to the module.

More optionally, when implementing the method, the accelerometer is a multi-axis accelerometer operable to measure components of acceleration ($A_x$, $A_y$, $A_z$) in at least one of radial, tangential and transverse axes in respect of rotations of the wheel. More optionally, the accelerometer is a silicon micromachined device.

More optionally, when implementing the method, the wireless interface is operable to communicate between the module and a processing arrangement (ECU) of a vehicle, the module forming a wireless network with other similar modules, wherein certain of the one or more modules are operable to function as one or more relay nodes for conveying signal exchange between a processing arrangement (ECU) and other of the one or more modules.

More optionally, when implementing the method, the wireless interface is operable to communicate between the module and a processing arrangement (ECU), the module forming a wireless network with other similar modules which is dynamically reconfigurable for conveying signals between the one or more modules and the processing arrangement (ECU).

Optionally, when implementing the method, the module is provided with a corresponding identification code (ID) for communicating to a processing arrangement (ECU) external to the module, so that the processing arrangement (ECU) is able to recognize the module when corresponding signal data has been sent therefrom and attribute the signal data to the module.

Optionally, the method includes a step of including one or more sources of electrical power for energizing the module, the one or more sources of electrical power including at least one rechargeable battery and one or more generators for recharging the one or more sources, the one or more generators deriving energy from rotations of the at least one wheel.

More optionally, when implementing the method, the one or more generators are at least one of:
(a) an electromagnetic generator based upon movement of a mass operable to move in response to rotation of the wheel; and
(b) a piezo-electric generator based upon force generated by a mass operable to apply a varying force to a piezo-electric device in response to rotations of the wheel.

Optionally, the method includes a step of coupling the wireless interface to an electrically conducting mesh of the tire of the wheel, the conducting mesh being operable to function as a wireless patch antenna for the module for supporting wireless communication between the module and a processing arrangement (ECU) external to the module.

Optionally, when implementing the method, the data processor is coupled to the data memory, and the module via its pressure sensor is operable to record the pressure (P) within the tire of the wheel in relation to time (t) as determined by a clock arrangement (CLK) included within the module, and the processor is operable to monitor changes in the pressure (P) with time (t) to identify one or more of:
(a) a gradual leak of air or gas from the tire indicative of a need to recharge the tire with air or gas; and (b) any abrupt depressurization of the tire indicative of a puncturing event or a rapid deflation event having occurred, or the tire having been exchanged.

More optionally, the method includes a step of communicating from the module a message that sensed data pertaining to the tire of the wheel being potentially unreliable on account of the abrupt depressurization.

More optionally, when implementing the method, the module is operable to monitor the pressure (P), irrespective of whether or not the module is in its hibernating energy-saving state.

Optionally, when implementing the method, the module is operable to switch between an active state and an energy-saving hibernating state.

More optionally, when implementing the method, the module is operable to switch between the active state and the hibernating state in response to one or more instructions communicated by wireless to the module.

More optionally, when implementing the method, the module is operable to switch from the active state to the energy-saving hibernating state in response to a period of time (t) in which the module detect one or more of:
(a) a cessation of changes in pressure (P) of the tire of the wheel during a predetermined period of time (t); and
(b) a cessation of changes in acceleration ($A_x, A_y, A_z$) sensed on the wheel during a predetermined period of time (t).

More optionally, when implementing the method, the module is operable to switch from the energy-saving hibernating state to the active state in response to the module detecting one or more of:
(a) a resumption of changes in pressure (P) of the tire of the wheel associated with rotations of the wheel; and
(b) a resumption of changes in acceleration ($A_x, A_y, A_z$) sensed on the wheel.

Optionally, when implementing the method, the module is operable to also respond with data indicative of expected characteristics of the wheel to which the module is mounted in operation.

Optionally, the method includes a step of monitoring using the module a tampering event applied to the wheel.

According to a third aspect, there is provided a wheel-monitoring apparatus for monitoring operation of at least one wheel of a vehicle, the apparatus including one or more sensor modules operatively mounted to revolve with the at least one wheel, the one or more modules being operatively coupled in communication with a processing arrangement (ECU) of the vehicle, the one or more modules being operable to sense at least one physical parameter of the wheel and to generate at least one corresponding sensor signal for the processing arrangement, the processing arrangement (ECU) being operable to process the at least one sensor signal to compute information indicative of operation of the at least one wheel, the apparatus including a sensor arrangement for sensing an angular orientation ($\Theta$) of the at least one wheel,
characterized in that
the processing arrangement (ECU) is operable to process the at least one sensor signal in respect of the angular orientation ($\Theta$) and/or an angular frequency ($\omega$) of rotation of the at least one wheel; and
the one or more modules are operable to sense dynamic changes occurring in the at least one physical parameter as communicated in the at least one sensor signal to the processing arrangement (ECU) for computing the information indicative of operation of the at least one wheel.

It will be appreciated that the angular frequency of rotation ($\omega$) is derivable from a first-order time derivative of a corresponding angular orientation ($\Theta$), namely $\omega = d\Theta/dt$.

Optionally, in the wheel-monitoring apparatus, the one or more modules include a temperature sensor for sensing a temperature ($T_{mod}$) thereat, the one or more modules being operable to communicate a signal indicative of the temperature ($T_{mod}$) to the processing arrangement (ECU) for use in computing the information indicative of operation of the at least one wheel.

Optionally, in the wheel-monitoring apparatus, the one or more modules include at least one of:
(a) a pressure sensor operable to sense a pressure (P) existing within a tire of the at least one wheel, the one or more modules being operable to communicate a signal indicative of the pressure (P) to the processing arrangement (ECU) for use in computing the information indicative of operation of the at least one wheel;
(b) a strain gauge sensor for measuring flexure of the tire of the at least one wheel, the module being operable to communicate a signal indicative of the flexure to the processing arrangement (ECU) for use in computing the information indicative of operation of the at least one wheel;
(c) an accelerometer for measuring acceleration ($A_x, A_y, A_z$) in at least one axis at a mounting location (L1, L2, L3, L4) of the one or more modules on the at least one wheel, the one or more modules being operable to communicate a signal indicative of the acceleration ($A_x, A_y, A_z$) to the processing arrangement (ECU) for use in computing the information indicative of operation of the at least one wheel; and
(d) a magnetic sensor for measuring a magnetic field applied to the one or more modules, the one or more modules being operable to communicate a signal indicative of the applied magnetic field to the processing arrangement (ECU) for use in controlling operation of the apparatus.

More optionally, in the wheel-monitoring apparatus, the accelerometer is a multi-axis accelerometer operable to measure components of acceleration ($A_x, A_y, A_z$) in at least one of radial, tangential and transverse axes in respect of rotations of the at least one wheel. Yet more optionally, the accelerometer is a silicon micromachined device.

More optionally, in the wheel-monitoring apparatus, the processing arrangement (ECU) is operable to apply auto-alignment to one or more sensing axes of the accelerometer to effectively align them to at least one of radial, tangential and transverse axes in respect of rotations of the at least one wheel. Such auto-alignment is capable of simplifying installation of the one or more modules by rendering placement of the one or more modules on the at least one wheel less angularly critical.

More optionally, in the wheel-monitoring apparatus, the processing arrangement (ECU) includes an angular resolver for implementing the auto-alignment which is operable to seek during its calibration to null lateral acceleration components and to seek to null tangential acceleration components integrated over one or more complete revolutions of the at least one wheel. By applying such auto-alignment, more representative signals describing operation of the at least one wheel are derivable for the processing arrangement to analyse. Optionally, acceleration measurements can be implemented fr a part of a revolution, for example a half-revolution, of the at least one wheel and the measurements for a remaining half-revolution of the at least one wheel synthesized therefrom for integration purposes; such an implementation is to be construed to mean integration for a complete revolution of the wheel.

More optionally, in the wheel-monitoring apparatus, the processing arrangement (ECU) is operable to calibrate its auto-alignment during at least one of:
(a) a calibration procedure when configuring the processing arrangement (ECU) in relation to its one or more modules; and
(b) in a dynamic manner during driving of the vehicle.

Optionally, in the wheel-monitoring apparatus, the one or more modules are mounted at one or more locations (L1, L2, L3, L4) on the at least one wheel, the one or more locations including:
(a) on a hub of the at least one wheel substantially at an axis (B-B) of rotation of the at least one wheel;
(b) on a hub of the at least one wheel at a radial distance from the axis of rotation (B-B) of the at least one wheel;
(c) on a hub of the at least one wheel in fluid communication with a filling valve of a tire of the wheel for sensing a pressure (P) within the tyre;
(d) within a tire of the at least one wheel for sensing a pressure (P) within the tire, the at least one module being mounted to a peripheral surface of a hub of the at least one wheel;
(e) within a tire of the wheel for sensing a pressure (P) within the tire, the one or more modules being mounted to an inside side-wall surface of the tire for measuring flexural characteristics of the side-wall; and
(f) on an inside surface of a peripheral rim of the at least one wheel for measuring acceleration thereat.

Optionally, in the wheel-monitoring apparatus, the one or more modules include at least one wireless interface for communicating between the one or more modules and the processing arrangement (ECU), the one or more modules forming a wireless network wherein certain of the one or more modules are operable to function as one or more relay nodes for conveying signal exchange between the processing arrangement (ECU) and other of the one or more modules.

Optionally, in the wheel-monitoring apparatus, the one or more modules include at least one wireless interface for communicating between the one or more modules and the processing arrangement (ECU), the one or more modules forming a wireless network which is dynamically reconfigurable for conveying signals between the one or more modules and the processing arrangement (ECU).

Optionally, in the wheel-monitoring apparatus, the one or more modules include at least one wireless interface for communicating between the one or more modules and the processing arrangement (ECU), the one or more modules forming a wireless network which is dynamically reconfigurable in response to the one or more modules changing between functional and non-functional states in operation, for enabling the apparatus to continue function with modified functionality in respecting of monitoring operation of the at least one wheel.

Optionally, in the wheel-monitoring apparatus, the one or more modules are each provided with a corresponding identification code (ID) for communicating to the processing arrangement (ECU) so that the processing arrangement (ECU) is able to recognize from which module corresponding signal data has been sent.

Optionally in the wheel-monitoring apparatus, the one or more modules include one or more sources of electrical power for energizing the one or more modules, the one or more sources of electrical power including at least one rechargeable battery and one or more generators for recharging the one or more sources, the one or more generators deriving energy from rotations of the at least one wheel.

More optionally, in the wheel-monitoring apparatus, the one or more generators are at least one of:
(a) an electromagnetic generator based upon movement of a mass operable to move in response to rotations of the at least one wheel; and
(b) a piezo-electric generator based upon force generated by a mass operable to apply a varying force to a piezo-electric device in response to rotations of the at least one wheel.

Optionally, in order to gather more representative measurements indicative of operation of the at least one wheel, the one or more modules of the wheel-monitoring apparatus are radially distributed around the at least one wheel for sensing operation of the at least one wheel at a plurality of angular locations therearound.

Certain conductive components in and around the at least one wheel are susceptible to creating radio shadows and causing Faraday screening. Optionally, in order to address problems arising from such radio shadows and Faraday screening, in the wheel-monitoring apparatus, at least one of the one or more modules include a wireless interface coupled to an electrically conducting mesh of a tire of the at least one wheel, the conducting mesh being operable to function as a wireless patch antenna for the at least one module for supporting wireless communication between the at least module and the processing arrangement (ECU).

Optionally, the wheel-monitoring apparatus includes a display coupled in communication with the processing arrangement (ECU) for presenting information to a driver of the vehicle indicating at least one of:
(a) an operating status of the one or more modules;
(b) a condition of the at least one wheel;
(c) one or more faults or potential faults associated with the at least one wheel;
(d) information regarding one or more actions to be taken by a driver of the vehicle in an event of one or more faults or potential faults associated with the at least one wheel being identified; and
(e) an indication of whether or not at the at least one wheel of the vehicle has been modified.

The display is however not limited to displaying such information as in (a) to (e) and is optionally capable of presenting other analysis information provided from the processing arrangement, for example a time record of changes in one or more wheel parameters as sensed by the one or more modules; for example, the display can beneficially present a graph representing tire pressure as a function of time, a list describing a configuration of modules presently coupled in communication with the processing arrangement, an indication whether or not wheel tampering has occurred, and so forth.

Optionally, in the wheel-monitoring apparatus, the processing arrangement (ECU) is provided with a wireless interface for communicating with a service facility remote from the vehicle, the processing arrangement (ECU) being operable to communicate information indicative of functionality of the at least one wheel, the information being indicative of one or more faults or potential faults associated with the at least one wheel as computed from signals provided from the one or more modules, and for receiving instructions from the service facility regarding actions for addressing the one or more faults or potential faults.

Optionally, the wheel-monitoring apparatus further comprises a global positioning unit for generating a signal indicative of a spatial position of the vehicle, and for conveying information via the processing arrangement (ECU) to the wireless interface to the service facility indicative of the spatial position of the vehicle.

Optionally, in the wheel-monitoring apparatus, the one or more modules include a processor coupled to an associated data memory, the one or more modules via their pressure sensors being operable to record a pressure (P) within a tire of the at least one wheel in relation to time (t) as determined by a clock arrangement (CLK) included within the one or more modules, and the processor is operable to monitor changes in the pressure (P) with time (t) to identify one or more of:
(a) a gradual leak of air or gas from the tire indicative of a need to recharge the tire with air or gas; and
(b) any abrupt depressurization of the tire indicative of a puncturing or rapid deflation event having occurred, or the tire having been exchanged.

More optionally, in the wheel-monitoring apparatus, the one or more modules are operable to communicate to the processing arrangement a message that sensed data pertaining to the tire of the at least one wheel being potentially unreliable due to the abrupt depressurization. Such processing is useful for detecting events, for example unauthorized swapping of tires, occurring when an associated wheel is temporarily dismantled from the vehicle and outside a wireless communication range of the processing arrangement (ECU). Generation of such a message is useful for enhancing safety; unauthorized or unintentional swapping of a tire or wheel of the vehicle can potentially contribute to safety risks or degraded reliability about which the driver of the vehicle is beneficially informed.

More optionally, in the wheel-monitoring apparatus, the one or more modules are operable to monitor the pressure (P), irrespective of whether or not the one or more modules are in their hibernating energy-saving state.

Optionally, in the wheel-monitoring apparatus, the one or more modules are operable to switch between an active state and an energy-saving hibernating state. More optionally, in the wheel-monitoring apparatus, the one or more modules are operable to switch between the active state and the hibernating state in response to one or more instructions communicated by wireless to the one or more modules.

More optionally, in the wheel-monitoring apparatus, the one or more modules are operable to switch from the active state to the energy-saving hibernating state in response to a period of time (t) in which the one or more modules detect one or more of:
(a) a cessation of changes in pressure (P) of a tire of the at least one wheel during a predetermined period of time (t); and
(b) a cessation of changes in acceleration ($A_x, A_y, A_z$) sensed on the at least one wheel during a predetermined period of time (t).

More optionally in the wheel-monitoring apparatus, the one or more modules are operable to switch from the energy-saving hibernating state to the active state in response to the one or more modules detecting one or more of:
(a) a resumption of changes in pressure (P) of a tire of the at least one wheel associated with rotations of the at least one wheel; and
(b) a resumption of changes in acceleration ($A_x, A_y, A_z$) sensed on the at least one wheel.

Optionally, in the wheel-monitoring apparatus, the at least one physical parameter includes at least one of:
(a) a pressure (P) within a tire of the at least one wheel as measured at the one or more modules;
(b) an acceleration ($A_x, A_y, A_z$) as measured substantially at the one or more modules; wherein the processing arrangement (ECU) is operable to apply an harmonic analysis to signals corresponding to the pressure (P) and/or the acceleration ($A_x, A_y, A_z$), the harmonic analysis being operable to identify harmonic components in respect of angular frequency ($\omega$) corresponding to a temporal rate of change of the angular orientation ($\Theta$) of the at least one wheel.

More optionally, in the wheel-monitoring apparatus, the harmonic analysis applies computation to at least one of:
(a) magnitudes of the harmonic components; and
(b) relative phase relationships between the harmonic components.

Other approaches to harmonic component analysis can optionally also be employed in the apparatus.

Certain problems or potential problems are susceptible to being identified merely by processing magnitudes of the harmonic components, whereas detection of flexural problems beneficially requires analysis of both harmonic magnetic and relative harmonic phase data in the processing arrangement; see FIG. 10 for example regarding skewing of presented peaks on account of changes in relative phase in harmonic components identified by the processing arrangement.

More optionally, in the wheel-monitoring apparatus, the processing arrangement (ECU) is operable to employ the harmonic analysis for identifying an occurrence of at least one of:
(a) the at least one wheel is imbalanced;
(b) a specific type of imbalance is present in the at least one wheel;
(c) the at least one wheel is skewed in relation to its axle;
(d) the at least one wheel is loose and wobbling about on its fasteners;
(e) a tire of the at least one wheel has defects in its flexural characteristics;
(f) a tire of the at least one wheel is insufficiently inflated;
(g) a tire of the at least one wheel is over inflated;
(h) a tire of the at least one wheel is oval or has a higher-order lobed distortion;
(i) the at least one wheel has a mass imbalance therein; and
(j) wheel bearings associated with an axle rotationally supporting the at least one wheel in operation are vibrating or rattling in an unexpected manner indicative of a fault, or a potentially developing fault.

The processing arrangement is not limited to detecting problems (a) to (j) above and is capable of detecting other problems, for example rattling noises in bearings associated with an axle of the wheel as manifested in acceleration or acoustic sensed signals at the one or more modules.

More optionally, in the wheel-monitoring apparatus, the processing arrangement (ECU) is operable to perform the analysis of the harmonic components by applying:
(a) a rule-based algorithm for identifying one or more faults or potential faults from the harmonic components;
(b) a neural network pre-programmed to identify one or more faults or potential faults when presented with data describing the harmonic components; and/or
(c) an harmonic filter for highlighting a specific combination of one or more harmonic components which are indicative of one or more faults or potential faults with the at least one wheel.

Such an approach is susceptible to avoiding a need to perform an harmonic analysis and therefore is computationally less intensive for the processing arrangement.

Optionally, in the wheel-monitoring apparatus, the processing arrangement (ECU) is provided with a predetermined list of types of wheel susceptible to being employed with the vehicle and associated expected characteristics, and the one or more modules are operable to communicate information to the processing arrangement (ECU) regarding an identification of a type of wheel onto which the one or more modules are mounted, and the processing arrangement (ECU) is operable to compare measured signals provided from the one or more modules with signals that would be expected from the one or more modules as simulated from the predetermined list, and wherein a disparity between the measured signals and the simulated signals is indicative of one or more faults or potential faults.

Optionally, in the wheel-monitoring apparatus, the one or more modules include one or more processors therein, and computation effort executed in operation for identifying one or more faults or potential faults in the at least one wheel is shared between the one or more processors and the processing arrangement (ECU).

Optionally, in the wheel-monitoring apparatus, the processing arrangement (ECU) is operable to send a message requesting the one or modules to respond back to the processing arrangement (ECU) for declaring their identification codes (ID) to the processing arrangement (ECU) for enabling the processing arrangement to identify its configuration of one or more modules, and for identifying any changes in the configuration of one or more modules occurring.

More optionally, in the wheel-monitoring apparatus, the one or more modules are operable to also respond with data indicative of expected characteristics of the at least one wheel to which the one of more modules are mounted.

More optionally, in the wheel-monitoring apparatus, the processing arrangement (ECU) is operable to compare rotation measurements from the sensor arrangement for sensing the angular orientation ($\Theta$) of the at least one wheel against signals supplied from the one or more corresponding modules for checking functional operation of the sensor arrangement and/or the one or more modules.

More optionally, in the wheel-monitoring apparatus, the sensor arrangement is an ABS wheel angular orientation sensor associated with brakes of the vehicle. Optionally, so as to obtain greater functionality from existing components already included on the vehicle, when implementing the wheel-monitoring apparatus, the sensor arrangement is an ABS wheel angular orientation sensor associated with brakes of the vehicle.

According to a fourth aspect, there is provided a method for monitoring operation of at least one wheel of a vehicle using a wheel-monitoring apparatus, the apparatus including one or more sensor modules operatively mounted to revolve with the at least one wheel, the one or more modules being operatively coupled in communication with a processing arrangement (ECU) of the vehicle, the method including steps of:
(a) sensing using the one or more modules at least one physical parameter of the at least one wheel and generating at least one corresponding sensor signal for the processing arrangement;
(b) sensing an angular orientation ($\Theta$) of the at least one wheel using a sensor arrangement of the apparatus;
(c) processing in the processing arrangement (ECU) the at least one sensor signal to compute information indicative of operation of the at least one wheel,
characterized in that the processing arrangement (ECU) is operable to process the at least one sensor signal in respect of the angular orientation ($\Theta$) and/or an angular frequency ($\omega$) of rotation of the at least one wheel; and
the at least one module is operable to sense dynamic changes occurring in the at least one physical parameter within one or more revolutions of the at least one wheel as communicated in the at least one sensor signal to the processing arrangement (ECU) for computing the information indicative of operation of the at least one wheel.

The modules may furthermore be used in a method of detecting misuse of tires wherein a data processor is operable to continuously or periodically update data stored in a data field containing data relevant to the functional status of the tire, said data field includes at least one of:
d) a record of the distance the tire has been used,
e) a field containing record of samples of pressure measured by the pressure sensor,
f) a field containing record of samples of the temperature measured by a temperature sensor mounted on said wheel for monitoring the temperature of the tyre;
validating said data fields by a method of validation of data relevant to the functional status of a tire stored in a module mounted in a wheel, wherein the following method steps are performed to validate said data:
a) monitoring a pressure (P) measured by a pressure sensor (760);
b) maintaining said data relevant to the functional status of the tire as valid as long as said pressure (P) is maintained above a predetermined threshold value;
c) setting said data relevant to the functional status of the tire as invalid as soon as said pressure (P) measured by said pressure sensor falls below said predetermined threshold value, and, determining that a misuse of the tire has been present if validated data shows that said field containing record of samples of pressure measured by the pressure sensor contains data outside a set range or if said field containing record of samples of the temperature measured by a temperature sensor contains data above a threshold value.

The invention claimed is:

1. A module operable to monitor at least a pressure within a tire of a wheel of a vehicle, the module being operatively mounted to the wheel, the module including:
 (a) a pressure sensor for measuring the pressure and generating a corresponding pressure signal;
 b) an associated data memory including a data field containing data relevant to a functional status of the tire; and
 (c) a data processor arranged to detect that the pressure measured by the pressure sensor has fallen below a predetermined threshold value and, upon detecting that the pressure measured by the pressure sensor has fallen below the predetermined threshold value, arranged to communicate a message that the data relevant to the functional status of the tire is unreliable for use in ascertaining the functional status of the tire and as a result to adapt functions of the data processor to default values assuming an inferior tire quality, the data processor being further arranged to detect that the pressure measured by the pressure sensor is above the predetermined threshold value and, upon detecting that the pressure measured by the pressure sensor is above the predetermined threshold value, arranged to communicate a message that the data relevant to the functional status of the tire is reliable for use in ascertaining the functional status of the tire and as a result to adapt application of subsystems of the vehicle to the data stored in the associated memory to control movement of the vehicle, wherein the data field containing data relevant to the functional status of the tire includes one or more of the following data:
a) tire slip curves,
b) tire size,
c) tire age, and
d) a record of the distance the tire has been used.

2. The module according to claim 1, wherein the data processor is prevented from changing the data relevant to the functional status of the tire from "unreliable" to "reliable" unless a key code signal is received.

3. The module according to claim 1, wherein the data processor is arranged to change the data relevant to the functional status of the tire from "unreliable" to "reliable" when a key code signal is received externally from the module.

4. The module according to claim 1, wherein the data processor is arranged to monitor the pressure measured by the pressure sensor and to communicate a message that the data relevant to the functional status of the tire is "reliable" as long as the pressure is maintained above a predetermined threshold value, and to communicate a message that the data relevant to the functional status of the tire is "unreliable" as soon as the pressure measured by the pressure sensor falls below the predetermined threshold value.

5. The module according to claim 1, wherein the data processor is coupled in communication with the associated data memory and arranged to receive the pressure signal.

6. The module according to claim 1, wherein the pressure sensor is mounted on a rim of the wheel.

7. The module according to claim 1, wherein the module further comprising
(c) a wireless interface coupled in communication with the processor for enabling the processor to communicate externally to the module;
(d) a source of power for providing operating power for the module;
wherein the data processor is operable to a generate a record of the pressure as a function of time in the data memory for monitoring the wheel and the tire and to communicate information derived from the record via the wireless interface for enabling a condition of the wheel to be monitored externally to the module.

8. The module as claimed in claim 1, wherein the module is arranged to detect depressurization events experienced by the wheel or an exchange of the tire.

9. The module as claimed in claim 1, wherein the module is mountable at one or more locations on the wheel, the one or more locations including:
(a) on a hub of the wheel substantially at an axis of rotation of the wheel;
(b) on a hub of the wheel at a radial distance from the axis of rotation of the wheel;
(c) on a hub of the wheel in fluid communication with a filling valve of a tire of the wheel for sensing a pressure within the tire;
(d) within a tire of the wheel for sensing a pressure within the tire, the module being mounted to a peripheral surface of a hub of the wheel;
(e) within a tire of the wheel for sensing a pressure within the tire, the module being mounted to an inside sidewall surface of the tire for measuring flexural characteristics of the side-wall; and
(f) on an inside surface of a peripheral rim of the wheel for measuring acceleration thereat.

10. The module as claimed in claim 1, wherein the module includes a temperature sensor for sensing a temperature thereat, the temperature sensor being operable to generate a temperature signal representative of the temperature for receipt at the data processor for at least one of recording in the data memory and communicating via a wireless interface externally to the module.

11. The module as claimed in claim 1, wherein the module includes at least one of:
(a) a strain gauge sensor for measuring flexure of the tire of the wheel, the strain gauge sensor being arranged to generate a signal indicative of the flexure for receipt at the data processor for at least one of recording in the data memory and communicating via a wireless interface externally to the module;
(b) an accelerometer for measuring acceleration in at least one axis at a mounting location of the module on the wheel, the accelerometer being arranged to generate a signal indicative of the acceleration for receipt at the data processor for at least one of recording in the data memory and communicating via the wireless interface externally to the module; and
(c) a magnetic sensor for measuring a magnetic field applied to the module, the module being arranged to generate a signal indicative of the applied magnetic field to the data processor for at least one of recording in the data memory and communicating via the wireless interface externally to the module.

12. The module as claimed in claim 1, wherein the module is provided with a corresponding identification code for communicating to a processing arrangement external to the module, so that a processing arrangement operatively in communication with the module is able to recognize the module when corresponding signal data has been sent therefrom and attribute the signal data to the module.

13. The module as claimed in claim 1, wherein the data processor is coupled to the data memory, and the module via the pressure sensor is arranged to record the pressure within the tire of the wheel in relation to time as determined by a clock arrangement included within the module, and the processor is arranged to monitor changes in the pressure with time to identify one or more of:
(a) a gradual leak of air or gas from the tire indicative of a need to recharge the tire with air or gas; and
(b) any abrupt depressurization of the tire indicative of a puncturing event or a rapid deflation event having occurred, or the tire having been exchanged.

14. The module as claimed in claim 13, wherein the module is arranged to sense data pertaining to the tire of the wheel that the tire is potentially unreliable on account of the abrupt depressurization and to communicate a message therefrom regarding the sensed data.

15. The module as claimed in claim 1, wherein the module is arranged to also respond with data indicative of expected characteristics of the wheel to which the module is mounted in operation.

16. The module as claimed in claim 1, wherein the module is arranged to monitor a tampering event applied to the wheel.

17. A method of validation of data relevant to a functional status of a tire stored in a memory of a module mounted in a wheel of a vehicle for tire maintenance, comprising:
a) monitoring a pressure in the tire measured by a pressure sensor;

b) maintaining the data relevant to the functional status of the tire as reliable as long as the pressure is maintained above a predetermined threshold value;

c) determining that the pressure measured by the pressure sensor has fallen below the predetermined threshold valve; and d) setting the data relevant to the functional status of the tire as unreliable for use in ascertaining the functional status of the tire upon determining that the pressure measured by the pressure sensor has fallen below the predetermined threshold value; and wherein a data processor is configured to set the data relevant to the functional status of the tire as unreliable as soon as the pressure measured by the pressure sensor falls below the predetermined threshold value, and the data processor of the module is arranged to communicate a message that the data relevant to the functional status of the tire is unreliable for use in ascertaining the functional status of the tire as soon as the pressure measured by the pressure sensor falls below the predetermined threshold value and as a result to adapt functions of the data processor to default values assuming an inferior tire quality, wherein the data field containing data relevant to the functional status of the tire includes one or more of the following data:

a) tire slip curves,
b) tire size,
c) tire age, and
d) a record of the distance the tire has been used, the data processor being further configured to detect that the pressure measured by the pressure sensor is above the predetermined threshold value and, upon detecting that the pressure measured by the pressure sensor is above the predetermined threshold value, arranged to communicate a message that the data relevant to the functional status of the tire is reliable for use in ascertaining the functional status of the tire and as a result to perform a step of adapting application of one or more subsystems of the vehicle to the data stored in the memory to control movement of the vehicle.

18. The method according to claim 17, comprising preventing the data processor from changing the data relevant to the functional status of the tire from "unreliable" to "reliable" unless a key code signal is received externally from the module.

19. The method according to claim 17, comprising changing, via the data processor, the data relevant to the functional status of the tire from "unreliable" to "reliable" upon reception of a key code signal externally from the module.

20. The method according to claim 17, wherein the data field containing data relevant to the functional status of the tire furthermore includes one or more of data a)-d) and:
e) a field containing a record of samples of the temperature measured by a temperature sensor mounted on the wheel for monitoring the temperature of the tire,
and the data processor is arranged to continuously or periodically update the data field.

21. The method according to claim 17, wherein the following method steps are performed:
(a) measuring the pressure using the pressure sensor of the module for generating a corresponding pressure signal;
(b) receiving the pressure signal at a data processor of the module, the data processor being coupled in communication with an associated data memory;
(c) generating a record of the pressure as a function of time in the data memory for monitoring the wheel and the tire; and
(d) communicating information derived from the record via a wireless interface of the module for enable a condition of the wheel to be monitored externally to the module.

22. The method according to claim 21, including a further step of detecting depressurization events experienced by the wheel and an exchange of the tire including exchange of corresponding information in the record.

23. The method according to claim 21, wherein the data processor is coupled to the data memory, and the module via the pressure sensor of the module is arranged to record the pressure within the tire of the wheel in relation to time as determined by a clock arrangement included within the module, and the processor is arranged to monitor changes in the pressure with time to identify one or more of:
(a) a gradual leak of air or gas from the tire indicative of a need to recharge the tire with air or gas; and
(b) any abrupt depressurization of the tire indicative of a puncturing event or a rapid deflation event having occurred, or the tire having been exchanged.

24. The method as claimed in claim 23, including sensing via the module that the tire of the wheel is potentially unreliable on account of the abrupt depressurization and communicating a message from the module regarding the sensed data.

25. The method according to claim 17, including a step of mounting the module at one or more locations on the wheel, the one or more locations including:
(a) on a hub of the wheel substantially at an axis of rotation of the wheel;
(b) on the hub of the wheel at a radial distance from the axis of rotation of the wheel;
(c) on the hub of the wheel in fluid communication with a filling valve of a tire of the wheel for sensing a pressure within the tire;
(d) within a tire of the wheel for sensing a pressure within the tire, the module being mounted to a peripheral surface of a hub of the wheel;
(e) within a tire of the wheel for sensing a pressure within the tire, the module being mounted to an inside sidewall surface of the tire for measuring flexural characteristics of the side-wall; and
(f) on an inside surface of a peripheral rim of the wheel for measuring acceleration thereat.

26. The method according to claim 17, wherein the module includes a temperature sensor for sensing a temperature thereat, the temperature sensor being arranged to generate a temperature signal representative of the temperature for receipt at the data processor for at least one of recording in the data memory and communicating via a wireless interface externally to tire module.

27. The method as claimed in claim 26, including a step of monitoring using the module a tampering event applied to the wheel.

28. The method as claimed in claim 17, wherein the module includes at least one of:
(a) a strain gauge sensor for measuring flexure of the fire of the wheel, the strain gauge sensor being arranged to generate a signal indicative of the flexure for receipt at the data processor for at least one of recording in the data memory and communicating via a wireless interface externally to the module;
(b) an accelerometer for measuring acceleration in at least one axis at a mounting location of the module on the wheel, the accelerometer being arranged to generate a signal indicative of the acceleration for receipt at the data processor for at least one of recording in the data memory and communicating via the wireless interface externally to the module; and (c) a magnetic sensor for measuring a magnetic field applied to the module, the module being arranged to generate a signal indicative of the applied magnetic field to the data processor for at least one of recording in the data memory and communicating via the wireless interface externally to the module.

29. The method as claimed in claim 17, wherein the module is provided with a corresponding identification code for communicating to a processing arrangement external to the module, so that the processing arrangement is able to recognize the module when corresponding signal data has been sent therefrom and attribute the signal data to the module.

30. A method of detecting misuse of tires of a vehicle for tire maintenance, comprising:

operating a data processor to continuously or periodically update data stored in a data field containing data relevant to a functional status of the tire, wherein the data field includes at least one of:

a) tire slip curves,
b) tire size,
c) tire age,
d) a record of the distance the tire has been used,
e) a field containing record of samples of pressure measured by the pressure sensor,
f) a field containing record of samples of the temperature measured by a temperature sensor mounted on the wheel for monitoring the temperature of the tire;

validating data in the data fields by validation of data relevant to the functional status of the tire stored in a module mounted in a wheel, the validation comprising monitoring, a pressure measured by a pressure sensor, maintaining the data relevant to the functional status of the tire as reliable as long as the pressure is maintained above a predetermined threshold value, when the pressure measured by the pressure sensor has fallen below the predetermined threshold value is determined, setting the data relevant to the functional status of the tire as unreliable upon determining that the pressure measured by the pressure sensor has fallen below the predetermined threshold value and as a result adapting functions of the data processor to default values assuming an inferior tire quality, and when the pressure measured by the pressure sensor is above the predetermined threshold value is determined, communicating a message that the data relevant to the functional status of the tire is reliable for use in ascertaining the functional status of the tire and as a result adapting application of subsystems of the vehicle to the data stored in the associated memory to control movement of the vehicle, wherein the data processor is arranged to communicate a message that the data relevant to the functional status of the tire is unreliable for use in ascertaining the functional status of the tire as soon as the pressure measured by the pressure sensor falls below the predetermined threshold value;

determining that the validated data shows that the field containing record of samples of pressure measured by the pressure sensor contains data outside a set range or if the field containing record of samples of the temperature measured by a temperature sensor contains data above a threshold value;

determining that a misuse of the tire has been present when the validated data shows that the field containing record of samples of pressure measured by the pressure sensor contains data outside the set range or if the field containing record of samples of the temperature measured by a temperature sensor contains data above the threshold value; and adapting a function of an on board system of the vehicle to the default values assuming the inferior tire quality.

\* \* \* \* \*